United States Patent Office 3,153,038
Patented Oct. 13, 1964

3,153,038
TRITERPENOID ACID DERIVATIVES
Josef Fried, Princeton, and David Walter Rosenthal, New Brunswick, N.J., assignors to Olin Mathieson Chemical Corporation, New York, N.Y., a corporation of Virginia
No Drawing. Filed Mar. 28, 1962, Ser. No. 183,014
24 Claims. (Cl. 260—239.57)

This invention relates to, and has for its objects the provision of new physiologically active steroids, methods for preparing the same, and new intermediates useful in said preparation.

This application is a continuation-in-part of a previous application, Serial No. 132,310, filed August 18, 1961, and now abandoned.

The final products of this invention can be represented by the formulae

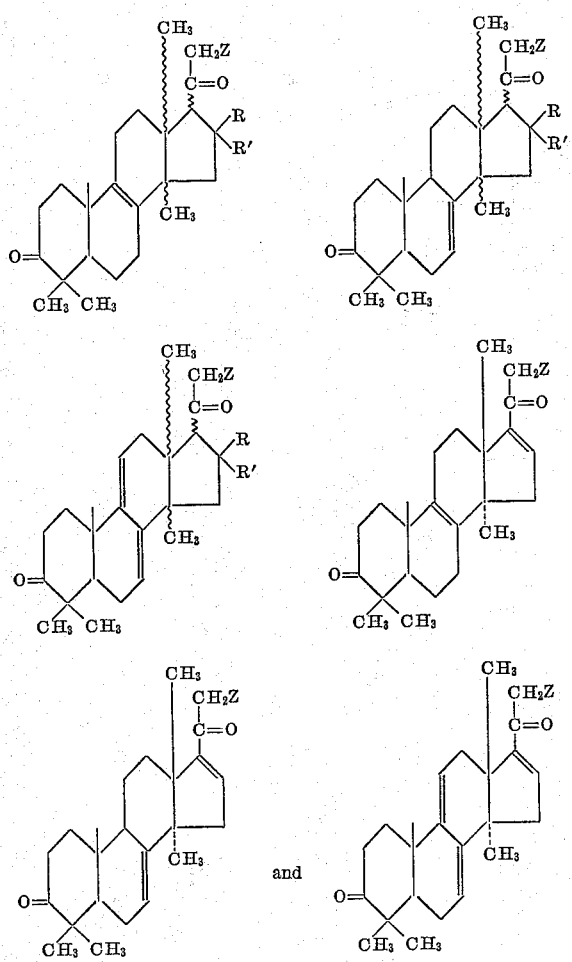

wherein Z is hydrogen, hydroxy or acyloxy and R and R' may be hydrogen and together R and R' may be oxygen.

(In this application and in the appended claims, whenever, in the formulae set forth herein, a curved line ($\xi$) is employed in the linkage of atoms, it is meant to denote that the connected atom may be either in the alpha or beta position, as is determined in the respective compounds involved.)

The preferred acyloxy radicals are those of hydrocarbon carboxylic acids of less than twelve carbon atoms, as exemplified by the lower alkanoic acids (e.g., acetic, propionic, butyric, and tert-pentanoic acid), the lower alkenoic acids, the monocyclic aryl carboxylic acids (e.g., benzoic and toluic acid), the monocyclic aryl lower alkanoic acids (e.g., phenacetic and $\beta$-phenylpropionic acid), the cycloalkane carboxylic acids and the cycloalkene carboxylic acids.

Those final products of this invention which are unsubstituted in the 21-position (i.e., Z is hydrogen) are physiologically active compounds which possess progestational activity and thus can be employed instead of progesterone, for example, in the treatment of habitual abortion for which purpose they can be administered in the same manner as progesterone, for example, the dosage being adjusted for the relative potency of the particular steroid. Those final products of this invention which are oxygenated in the 21-position (i.e., Z is hydroxy or acyloxy) are physiologically active compounds which possess mineralocorticoid activity and thus can be employed instead of desoxycorticosterone, for example, in the treatment of Addison's disease, for which purpose they can be administered in the same manner as desoxycorticosterone, for example, the dosage being adjusted for the relative potency of the particular steroid.

The final products of this invention wherein Z is hydroxy or acyloxy, are prepared by the process of this invention which entails a number of steps beginning with a triterpenoid acid as a starting materal. By a triterpenoid acid, it is here meant a polymethylsteroid, having a D-ring structure represented by the formula:

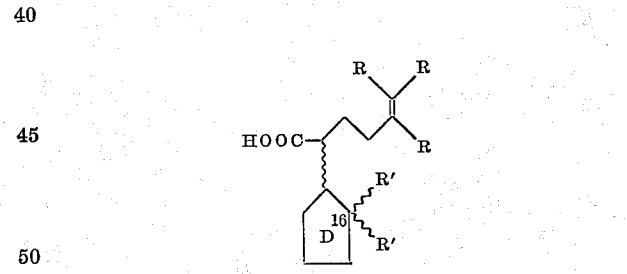

wherein R may be the same or different and may be either hydrogen or alkyl and R' may be the same or different and may be selected from the group consisting of hydrogen and hydroxy. Examples of the triterpenoid acids which may be employed in the practice of this invention include eburicoic, polyporenic, tumulosic, pinicolic, elemolic, elemonic, dehydroeburicoic, dehydroelemolic, dehydroelemonic, and other like acids. The steps of the process (employing eburicoic acid as the starting material) are shown by the following equations wherein R and R' are the same or different and represent hydrogen or acyl, and R'' represents acyl:
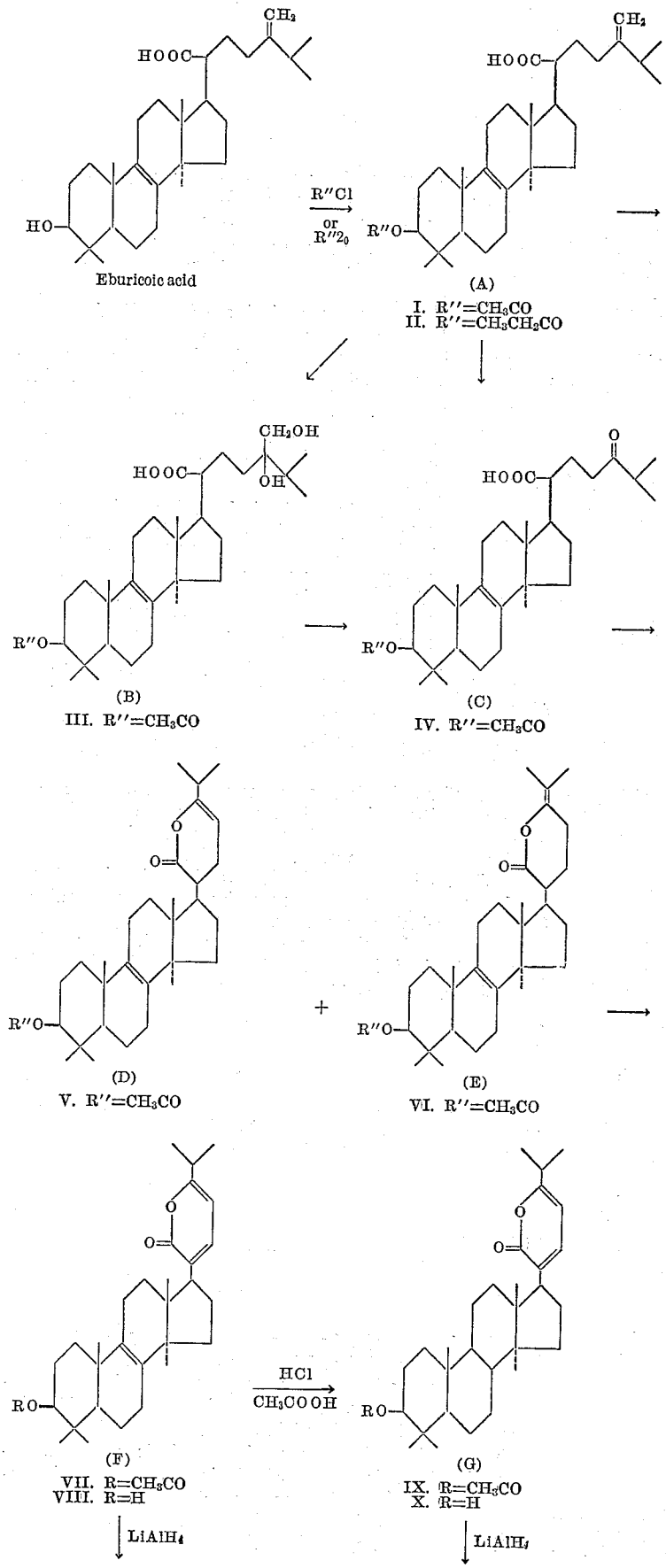

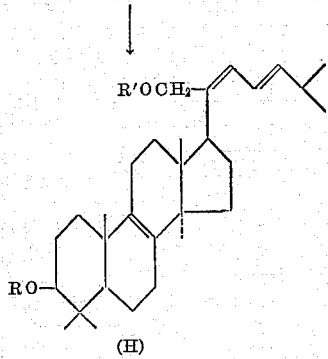
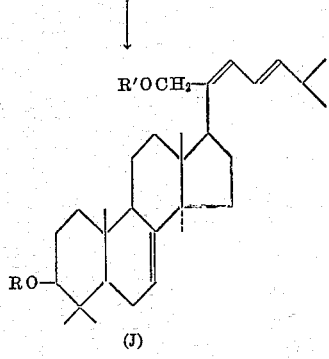

(H)
XI. R=R'=H
XII. R=R'=CH₃CO
XIII. R=CH₃CO; R'=H (J)
XIV. R=R'=H
XV. R=R'=CH₃CO
XVI. R=CH₃CO; R'=H

↓ O₃

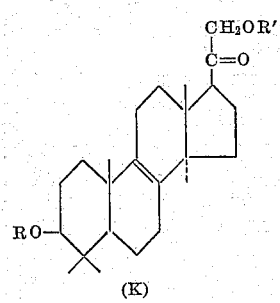
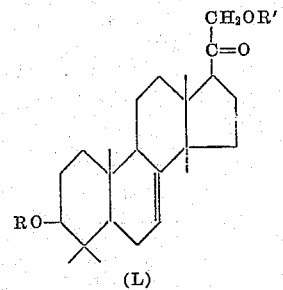

(K)
XVII. R=R'=H
XVIII. R=R'=CH₃CO
XIX. R=H; R'=CH₃CO
XX. R=CH₃CO; R'=H (L)
XXI. R=R'=H
XXII. R=R'=CH₃CO
XXIII. R=H; R'=CH₃CO
XXIV. R=CH₃CO; R=H

↓

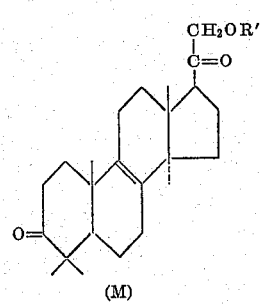
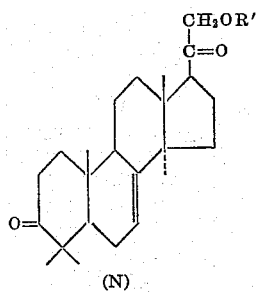

(M)
XXV. R'=H
XXVI. R'=CH₃CO (N)
XXVII. R'=H
XXVIII. R=CH₃CO

The final products of this invention, wherein Z is hydrogen, are prepared by a process of this invention which entails a number of steps beginning with corresponding 21-hydroxy steroid derivatives (Compounds K, L, M, and N) as starting materials. These steps are shown by the following equations, wherein Y is oxo (O=), or β-acyloxy, and A is lower alkyl or tolyl:

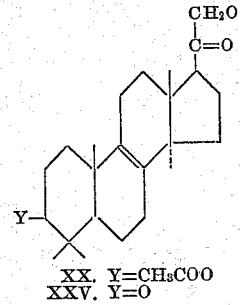
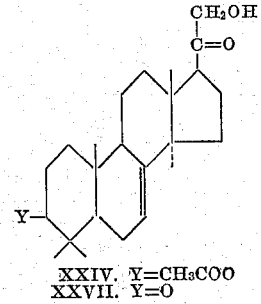
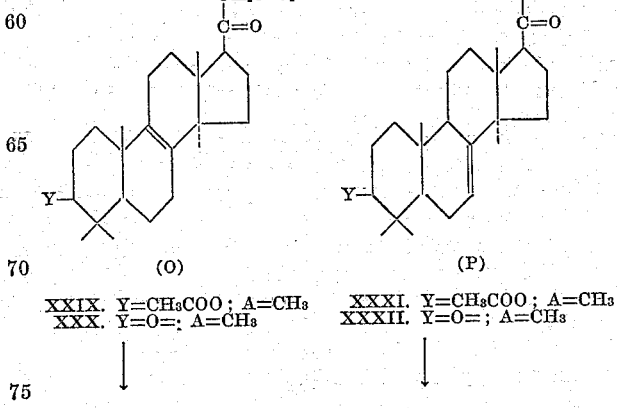

XX. Y=CH₃COO
XXV. Y=O

XXIV. Y=CH₃COO
XXVII. Y=O (O)
XXIX. Y=CH₃COO; A=CH₃
XXX. Y=O=; A=CH₃

(P)
XXXI. Y=CH₃COO; A=CH₃
XXXII. Y=O=; A=CH₃

↓                    ↓

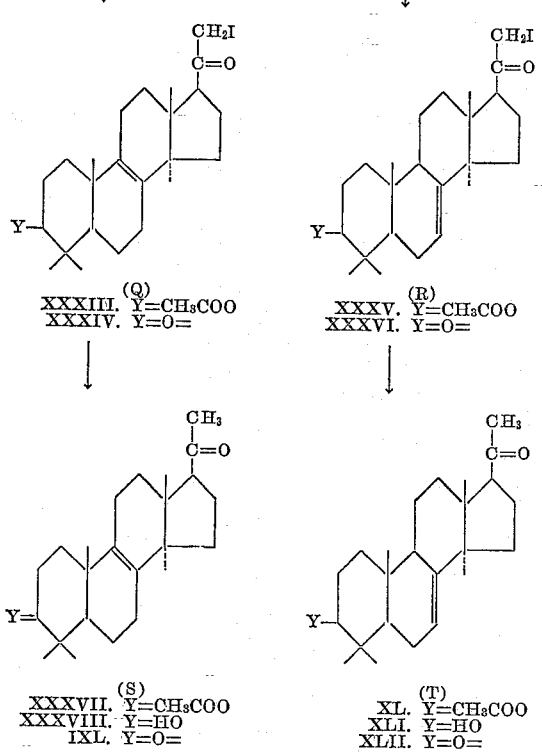

XXXIII. Y=CH₃COO (Q)
XXXIV. Y=O=

XXXV. Y=CH₃COO (R)
XXXVI. Y=O=

XXXVII. Y=CH₃COO (S)
XXXVIII. Y=HO
IXL. Y=O=

XL. Y=CH₃COO (T)
XLI. Y=HO
XLII. Y=O=

In the first step of the process of this invention eburicoic acid is converted to its 3-ester derivative (Compounds A). The 3-acetate of eburicoic acid is a known compound. Other 3-esters can be prepared in the usual manner by reacting with the desired acylating agent (e.g., acyl chloride or acid anhydride) in the presence of a base, such as pyridine. Although any ester can be prepared, the preferred esters are those with hydrocarbon carboxylic acids of less than twelve carbon atoms. These are formed by reacting with the acyl chloride or acid anhydride of a hydrocarbon carboxylic acid of less than twelve carbon atoms, such as one of the acids listed hereinbefore.

The 3-ester is then converted to a corresponding ester of 24-keto-Δ⁸-lanostene-21-acid (Compounds C). This may be done by ozonolysis of Compounds A and reducing the ozonide formed by treatment with either hydrogen in the presence of a hydrogenation catalyst, such as palladium on charcoal, or an electropositive metal, such as zinc, in the presence of an acid, such as glacial acetic acid, whereby Compounds C are obtained directly. Compounds C can also be obtained in a two-step process by first treating Compounds A with a hydroxylating agent, such as osmium tetroxide, to yield the corresponding 3-ester of 3β,24,28-trihydroxy-Δ⁸-eburicene - 21 - oic acid (Compounds B), which are new compounds of this invention, and then cleaving the glycol, as by treatment with lead tetraacetate to yield Compounds C.

Compounds C are then lactonized by treatment with an acid anhydried and a salt of a strong base and a weak acid, such as sodium acetate in acetic anhydride, to yield a mixture of the α-lactone (Compounds D) and β-lactone (Compounds E) of the corresponding 3-esters of 3β-hydroxy-24-keto-Δ⁸-lanostene-21-oic acid. These lactones are now compounds of this invention. The reaction preferably carried out at an elevated temperature, such as the reflux temperature of the organic solvent employed and the two lactones are separated chromatographically. However, since both the α-lactone and β-lactone give the same product in the next step of the process of this invention, such separation is not necessary and a mixture of the lactones may be used directly.

Compounds D and E are then dehydrogenated, as by treatment with palladium on characoal at an elevated temperature, to yield the corresponding 3-ester of 3β,24-dihydroxy-Δ⁸,²⁰⁽²²⁾²³-lanostadiene - 21 - oic acid lactone (Compounds F), which are new compounds of this invention. If desired, the ester can then be saponified in the usual manner, as by treatment with a base such as potassium hydroxide to yield the corresponding free 3β-hydroxy derivative, and the free 3-hydroxy compound oxidized to the corresponding 3-keto derivative in the usual manner, as by treatment with chromium trioxide.

Compounds F can then be isomerized to the corresponding 3β,24-dihydroxy-Δ⁷,²⁰⁽²²⁾,²³-lanostadiene-21-oic acid lactone derivative (Compounds G), which are new compounds of this invention, by treatment with hydrogen chloride in a solvent (e.g., glacial acetic acid).

Compounds F and G are then converted to the final 21-oxygenated pregnene derivatives of this invention by the same series of steps. If a Compound F is employed the final products and all intermediates contain a double-bond in the 8,9-position. If a Compound G is employed, the final products and all intermediates contain a double-bond in the 7,8-position.

In the first step of this process, compounds F and G are reduced by treatment with lithium aluminum hydride to yield a corresponding 3β,21-dihydroxy-Δ⁸,²⁰⁽²²⁾,²³-lanostatriene (Compouns H) and 3β,21-dihydroxy-Δ⁷,²⁰⁽²²⁾,²³-lanostatriene (Compounds J) derivatives, respectively. These compounds can be converted to their 21-ester (or 3,21-diester, if a free 3-hydroxy compound is initially produced) derivatives by the usual acylation procedure. The preferred acylating agents are the acyl chlorides and acid anhydrides of the hydrocarbon carboxylic acids of less than twelve carbon atoms mentioned hereinbefore. All Compounds H and J are new compounds of this invention.

Compounds H and J are then oxidized, as by treatment with ozone and reduction of the ozonide formed, to yield 3β,21-dihydroxy-4,4,14α-trimethyl - Δ⁷-5α-pregnene - 20-one (Compounds L), respectively, or monor or diester of each of these depending on the degree of esterification of the starting material. Moreover, if a diester is initially formed, it can be selectively saponified to the 3-monoester by treatment with potassium carbonate and if a dihydroxy compound is initially formed, it can be selectively esterified to the 21-monoester by treatment with the desired acid anhydride in pyridine. Thus, all combinations of Compounds K and L, containing two free hydroxyl groups, a 3-monoester group, a 21-monoester group, or a 3,21-diester group can be obtained. Compounds K and L are new compounds of this invention.

Compounds K and L, containing a free 3β-hydroxy group, can then be oxidized in the usual manner, as by treatment with chromium trioxide, to yield the final products of this invention, which contain either a 21-hydroxy group or a 21-acyloxy group (Compounds M and N).

If a 21-unsubstituted compound is desired (Compounds S and T), a Compound K, L, M or N, containing a free 21-hydroxy group, is acylated by treatment with an organic sulfonyl chloride, such as a lower alkanesulfonyl chloride (e.g., mesyl chloride) or tosyl chloride, to yield the corresponding 21-sulfonic acid ester (Compounds O and P), which are new compounds of this invention.

Compounds O and P are then converted to their corresponding 21-iodo derivatives (Compounds Q and R, respectively) by treatment with an alkali metal iodide (e.g., sodium iodide), preferably at an elevated temperature. Compounds Q and R are new compounds of this invention.

Compounds Q and R are then reduced, as by treatment with sodium bisulfite, to yield the final products of this invention which are unsubstituted in the 21-position (Compounds S and T). If a 3β-hydroxy or 3β-acyloxy derivative is initially formed it may be oxidized to the corresponding 3-keto derivative (after saponification of the 3-ester group, if present) to yield the final 3-keto compounds of this invention. The procedures hereinbefore set forth with regard to the treatment of eburicoic acid to obtain the final products of this invention, may be likewise applied to other triterpenoid acids to give like results. Thus, where tumulosic acid is employed as the starting material, the results set forth in the following equations are obtained:

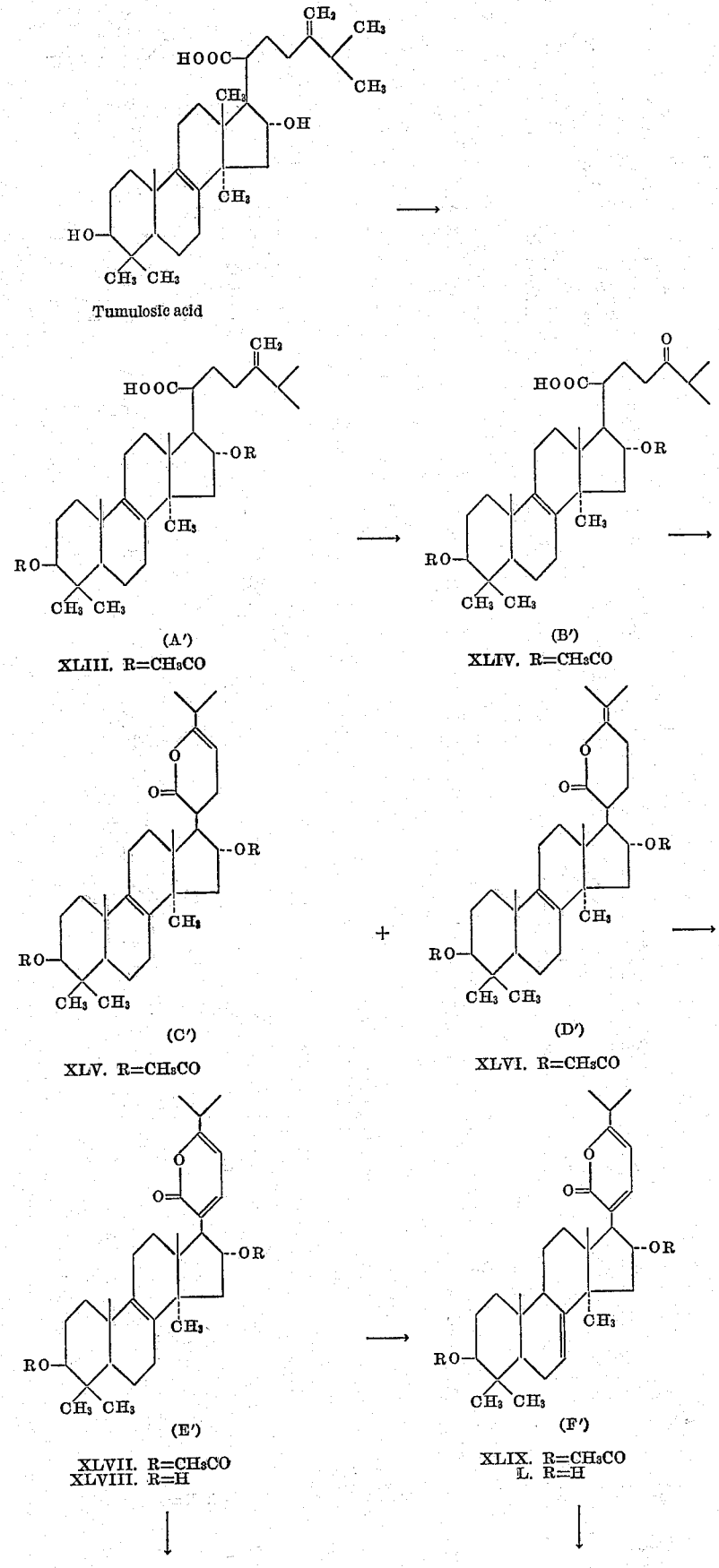

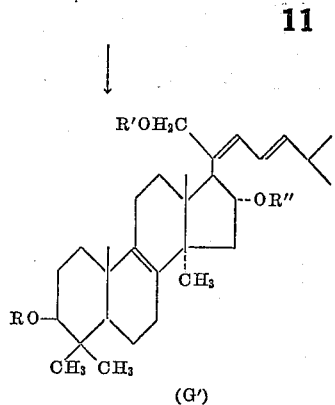

(G')

LI. R=R'=R''=H
LII. R=R'=R''=CH₃CO
LIII. R=CH₃CO; R'=R''=H
LIV. R=R''=H; R'=CH₃CO

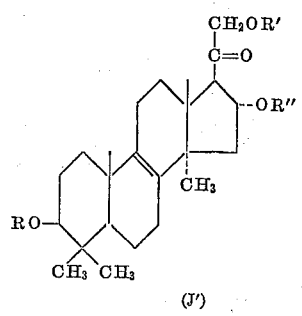

(J')

LIX. R=R'=R''=H
LX. R=R'=R''=CH₃CO
LXI. R=CH₃CO; R'=R''=H
XII. R=R''=H; R'=CH₃CO
LXIII. R=R''=CH₃CO; R'=H

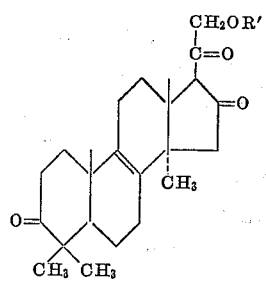

(L')

LXIX. R'=CH₃CO
LXX. R'=H

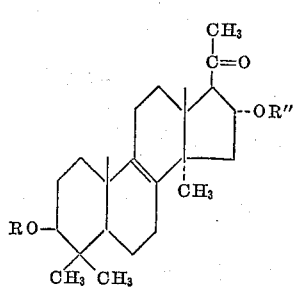

(N')

LXXIII. R=R''=CH₃CO

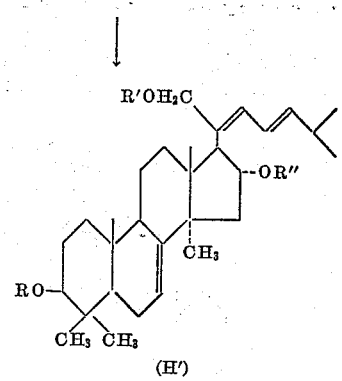

(H')

LV. R=R'=R''=H
LVI. R=R'=R''=CH₃OH
LVII. R=CH₃CO; R'=R''=H
LVIII. R=R''=H; R'=CH₃CO

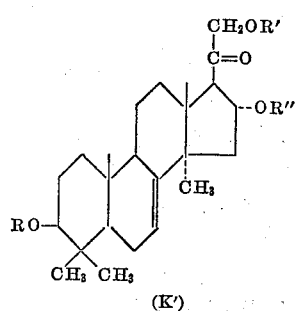

(K')

LXIV. R=R'=R''=H
LXV. R=R'=R''=CH₃CO
LXVI. R=CH₃CO; R'=R''=H
LXVII. R=R''=H; R'=CH₃CO
LXVIII. R=R''=CH₃CO; R'=H

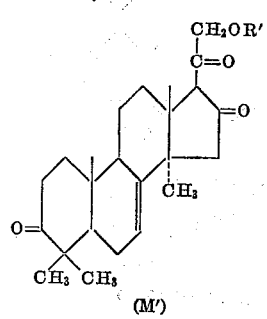

(M')

LXXI. R'=CH₃CO
LXXII. R'=H

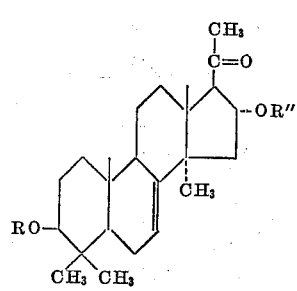

(O')

LXXVI. R=R''=CH₃CO

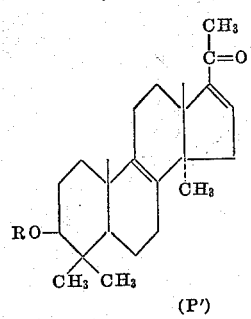
(P')
LXXIV. R=H
LXXV. RO=O=

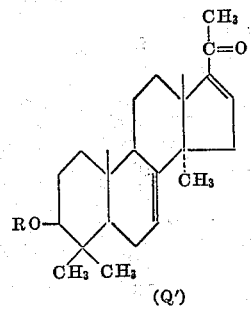
(Q')
LXXVII. R=H
LXXVIII. RO=O=

Thus, following the same procedures outlined above in the case of eburicoic acid, tumulosic acid is first converted to its 3,16 ester derivative (Compounds A'), these being ozonized and reduced to a corresponding ester of 24-keto-$\Delta^8$-lanostene-21-oic-acid (Compounds B'). Compounds B' are then lactonized to yield a mixture of α-lactone (Compounds C') and β-lactone (Compounds D') of the corresponding 3,16 - esters of 3β,16α - dihydroxy - 24-keto-$\Delta^8$-lanostene-21-oic acid. These lactones are new compounds of this invention.

Compounds C' and D' are then dehydrogenated to yield the corresponding 3,16-ester of 3β,16α,24-trihydroxy-$\Delta^{8,20(22),23}$-lanostatriene-21-oic acid lactone (Compounds E'), which are also new compounds of this invention. Compounds E' can then be isomerized to the corresponding 3β,16α,24 - trihydroxy-$\Delta^{7,20(22),23}$-lanostatriene-21-oic acid lactone derivative (Compounds F') which are new compounds of this invention. Compounds E' and F' are then converted to the final 21-oxygenated pregnene derivatives of this invention by the same series of steps. Compounds E' and F' are reduced to yield the corresponding 3β,16α,21 - trihydroxy-$\Delta^{8,20(22),23}$ - lanostatriene (Compounds G') and 3β,16α,21 - trihydroxy - $\Delta^{7,20(22)23}$-lanostatriene (Compounds H') derivatives, respectively. Compounds G' and H' are then oxidized to yield 3β,16α,21-trihydroxy - 4,4,14α - trimethyl - $\Delta^8$ - 5α - pregnene - 20-one (Compounds J') and 3β,16α,21-trihydroxy-4,4-14α-trimethyl - $\Delta^7$ - 5α - pregnene-20-one (Compound K'), respectively. These are also new compounds of this invention. Compounds J' and K' can then be oxidized to form the final products of this invention, which contain either a 21-hydroxy group or a 21-acyloxy group (Compounds L' and M'). To obtain the 21-unsubstituted compounds (Compounds N', O', P' and Q'), a Compound J' K' L' or M' is acylated with a sulfonic acid halide, the resulting compound converted to the corresponding 21-iodo derivative and the iodo derivative is then reduced to yield the 21-unsubstituted Compounds N', O', P' and Q', by practicing the same procedure as outlined above for eburicoic acid conversion. The same process as hereinbefore set forth is applicable wherein the starting material is pinicolic, elemolic, 3-epi-elemolic, and elemonic acids.

When the starting material employed in the practice of this invention is polyporenic, dehydroeburicoic, and other like acids having two double bonds in the 7 and 9(11) positions, there is a slight variation in the procedure. In the processing of eburicoic, tumulosic, and like acids, isomerization can be achieved by treating Compounds F and E' set forth above, with hydrogen chloride in a solvent. Since such results are not possible in the case of the 7,9(11) double bonded acids, this step is bypassed in their processing. However, all other steps of the process remain the same.

For example, if polyporenic acid C is employed as the starting material of this invention, the following equations represent the process set forth hereinbefore:

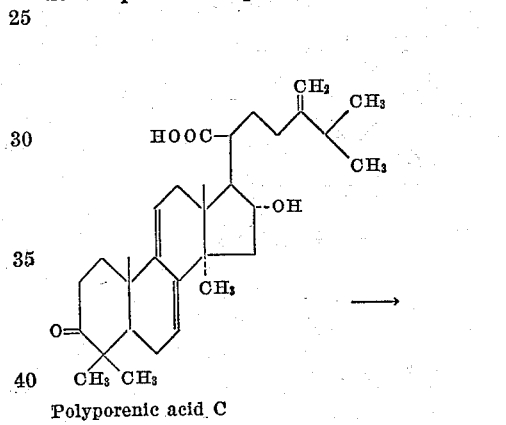
Polyporenic acid C

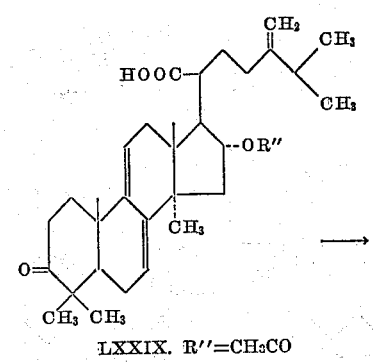
LXXIX. R''=CH₃CO

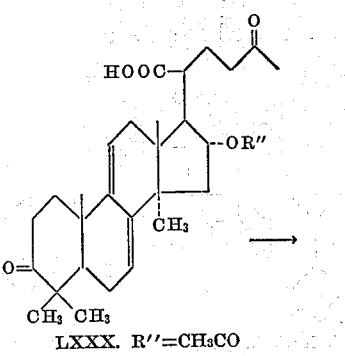
LXXX. R''=CH₃CO

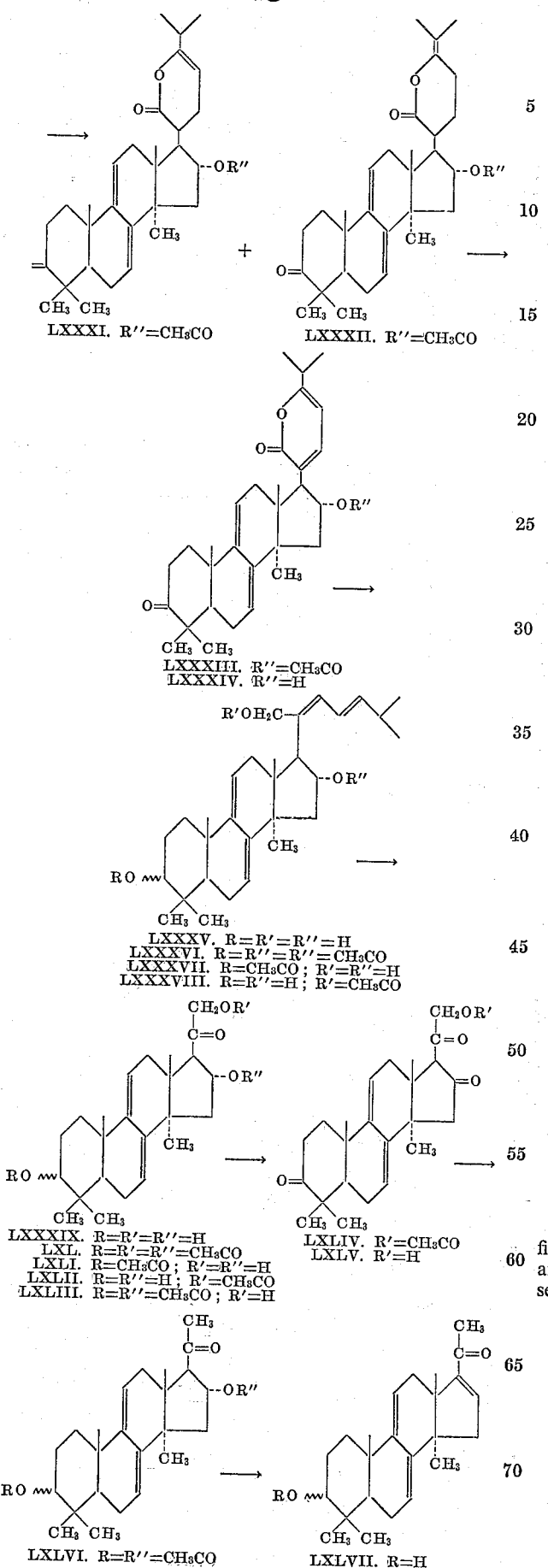
In the case of such triterpenoid acids as elemolic, elemonic and dehydroelemonic, having the following structural formulae
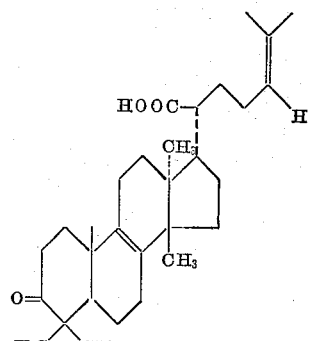
Elemonic acid
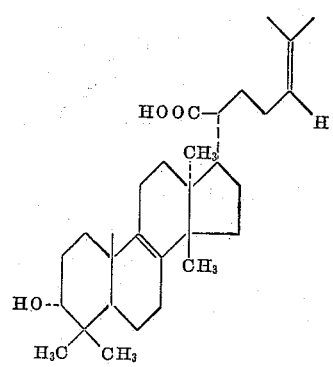
Elemolic acid
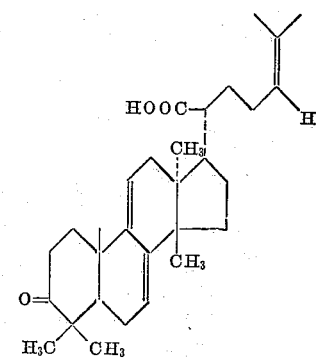
Dehydroelemonic acid
final products having differently positioned substituents are obtained in the practice of this invention as can be seen from the following formulae:
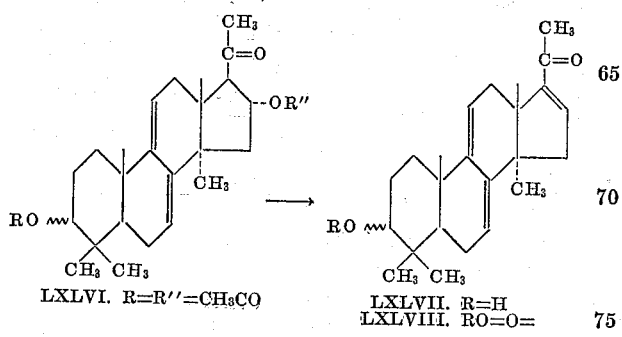
Elomolic acid derivative

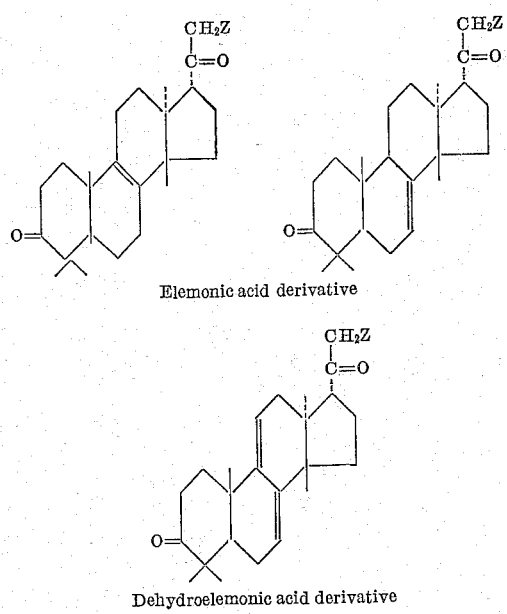

Elemonic acid derivative

Dehydroelemonic acid derivative

The following examples illustrate the invention (all temperatures being in centigrade):

EXAMPLE 1

Eburicoic Acid 3-Propionate (II)

To a solution of 10 g. of eburicoic acid in 50 ml. of anhydrous pyridine is added 10 ml. of propionic anhydride and the mixture is allowed to remain at room temperature for 18 hours. Five grams of ice is then added and 30 minutes later the mixture is diluted slowly with 250 ml. of ice and water. The resulting precipitate is filtered, washed thoroughly with water, dried in vacuo and recrystallized from 95% alcohol yielding pure eburicoic acid 3-propionate (II).

Similarly, by substituting other acid anhydrides or acyl halides for the propionic anhydride in the procedure of Example 1, the corresponding 3-esters are formed. Thus, butyric anhydride and benzoyl chloride yield the 3-butyrate and 3-benzoate of eburicoic acid, respectively.

EXAMPLE 2

3β-Acetoxy-24-Keto-Δ⁸-Lanostene-21-Oic Acid (IV)

Through a solution of 15 g. of eburicoic acid 3-acetate (I) in a mixture of 150 ml. of chloroform and 150 ml. of ethyl acetate, cooled in a Dry Ice-acetone bath, is passed 26.2 l. of ozone (1 mole of ozone contained in .89 l. of oxygen). The resulting solution is allowed to warm to room temperature and then added to a suspension of 975 mg. of pre-reduced 5% palladium on charcoal catalyst in 50 ml. of ethyl acetate. 550 ml. of hydrogen is taken up rapidly, following which the solution is filtered and the filtrate evaporated to dryness in vacuo.

Alternately the ozonide can be decomposed with zinc in acetic acid as follows: The ozonolysis mixture obtained from 50 g. of eburicoic acid 3-acetate in 50 ml. of chloroform and 500 ml. of ethyl acetate, is allowed to warm up to −10° when it is diluted with 50 ml. of glacial acetic acid. Powdered zinc is then added in portions with stirring and the temperature allowed to rise to +15°. A total of 25 g. of zinc is required. After 2½ hours the reaction mixture is filtered and the zinc and zinc salts washed thoroughly with ethyl acetate. The ethyl acetate-chloroform filtrate is washed thoroughly with water, dried over sodium sulfate and evaporated to dryness in vacuo. A total of about 56 g. of the crude keto acid (IV) is obtained.

The acid (IV) is obtained in pure form by chromatography on neutral alumina. For this purpose a solution of 14 g. of the crude acid is dissolved in 50 ml. of benzene and charged to the column containing 280 g. of alumina. 50% chloroform-benzene (9 l.) elutes about 1.9 g. of pure acid melting at about 234–236°, which is followed by about 1.2 g. of acid when the eluant is changed to 75% chloroform in benzene (3 l.). An additional 1.3 g. of pure acid is obtained with chloroform (5 l.). The column is then stripped with 5% acetic acid in chloroform (2 l.) which elutes about 10.4 g. of crude material which is dissolved in 100 ml. of benzene and rechromotographed on 200 g. of silica gel. Elution with benzene (750 ml.) gives about 4 g. of amorphous material which is followed by crystalline acid (about 2.4 g.) when the eluant is changed to chloroform (8 l.). The pure acid (IV) has the following properties: M.P. 236–238°; $[\alpha]_D^{23} +52°$ (c., .49 in chlf.);

$\lambda_{max.}^{CS_2}$ 5.78 and 5.90μ; $\lambda_{max.}^{Nujol}$ 5.83–5.90; 8.05, 9.76 and 9.94μ

Analysis.—Calcd. for $C_{32}H_{50}O_5$ (514.72): C, 74.67; H, 9.79. Found: C, 74.64; H, 9.54.

EXAMPLE 3

Tumulosic acid 3,16 diacetate (XLIII) is treated in accordance with the procedure set forth in Example 2 above, yielding 3β,16α-diacetoxy-24-keto-Δ⁸-lanostene-21-oic acid (XLIV).

EXAMPLE 4

Polyporenic acid C 16-acetate (LXXIX) is treated in accordance with the procedures set forth in Example 2 above yielding 16α-acetoxy-3,24-diketo-dehydroeburicoic acid (LXXX).

EXAMPLE 5

3β-Acetoxy-24,28-Dihydroxy-Δ⁸-Eburicene-21-Oic Acid (III)

To a solution of 2 g. of eburicoic acid 3-acetate (I) in 20 ml. of benzene and 2 ml. of pyridine is added dropwise a solution of 1 g. of osmium tetroxide in 10 ml. of benzene. Addition is complete in 1 hour and the reaction mixture is allowed to remain at room temperature for an additional 4 hours. The resulting dark solution is diluted with 76 ml. of dioxane and saturated with hydrogen sulfide for 15 minutes. The resulting suspension is filtered with the aid of Celite and the filtrate evaporated to dryness. The resulting residue (about 2.1 g.) is triturated with acetone leaving about 1.5 g. of the dihydroxy acid (III) melting at about 238–242°. Recrystallization of this material from 95% ethanol furnishes the pure dihydroxy acid possessing the following properties: M.P. about 246–284°;

$\lambda_{max.}^{Nujol}$ 2.95, 5.80, 6.05 and 8.00–8.10μ

Analysis.—Calcd. for $C_{33}H_{54}O_6$: C, 72.49; H, 9.92. Found: C, 71.76; H, 9.92.

EXAMPLE 6

3β-Acetoxy-24-Keto-Δ⁸-Lanostene-21-Oic Acid (IV)

A solution of 1.17 g. of the 24,28-dihydroxy acid (III) in 200 ml. of .0108 molar lead tetraacetate solution in glacial acetic acid is allowed to stand at room temperature for 35 minutes. A few drops of ethylene glycol are then added to reduce the excess lead tetraacetate and the solution is concentrated in vacuo and diluted with water. The resulting suspension is extracted with ethyl acetate and the ethyl acetate extract washed several times with water, dried over sodium sulfate and evaporated to dryness in vacuo. The resulting crude produce (about 1.07 g.) on recrystallization from acetone furnishes about 700 mg. of the pure keto acid IV possessing the following properties: M.P. about 225–227°; $[\alpha]_D^{23} +50°$ (c., .43 in chlf.).

Analysis.—Calcd. for $C_{32}H_{50}O_5$: C, 74.67; H, 9.79. Found: C, 74.32; H, 9.50.

This acid is identical in all respects with the product obtained in Example 2.

EXAMPLE 7

*3β - Acetoxy - 24 - Hydroxy - Δ$^{8,23}$ - Lanostadiene - 21-Oic Acid Lactone (α-Lactone) (V) and 3β-Acetoxy-24 - Hydroxy - Δ$^{8,24}$ - Lanostadiene - 21 - Oic Acid Lactone (β-Lactone) (VI)*

To a solution of 15.4 g. of 3β-acetoxy-24-keto-Δ$^8$-lanostene-21-oic acid (IV) in 150 ml. of acetic anhydride is added 3.75 g. of anhydrous sodium acetate and the resulting suspension is heated under reflux for 10 hours. Upon cooling, the acetic anhydride solution is decanted from the sodium acetate and the latter washed thoroughly with benzene. The combined acetic anhydride-benzene solutions are evaporated to dryness in vacuo, the residue redissolved in benzene and filtered from the precipitated sodium acetate. The clear benzene solution is evaporated to dryness leaving a mixture of the α- and β-enol lactones (V and VI) (about 15.1 g.). Separation is achieved by chromatography on neutral alumina as follows: The total residue is dissolved in 50 ml. of benzene and 50 ml. of hexane and charged to a column containing 300 g. of neutral alumina. Elution with 250 ml. of benzene-hexane (1:1) produces about 3.1 g .of crude crystalline 3β-acetoxy-24-hydroxy-Δ$^{8,23}$-lanostadiene-21-oic acid is lactone (α-lactone) (V), which after crystallization from 95% ethanol is analytically pure and has the following properties: M.P. about 169–171°; [α]$_D^{23}$ +37°;

$\lambda_{max.}^{Nujol}$ 5.69, 5.78, 5.93, (weak), 8.05, 12.05, 12.62, and 13.30μ

The 12.05 and 12.63μ bands are diagnostic for the α-lactone and are absent in the β-lactone.

*Analysis.*—Calcd. for C$_{32}$H$_{48}$O$_4$ (496): C, 77.37; H, 9.73. Found: C, 77.41; H, 9.82.

Continued elution of the alumina column with benzene (8 l.) produces a total of about 4 g. of material in 12 fractions, all of which melt between 150–160° and represent a mixture of the α- and β-lactones. Rechromatography of this mixture is necessary to obtain the pure β-lactone. For the purpose all of the fractions are combined (4 g.), dissolved in 20 ml. of benzene and 80 ml. of hexane and charged to a column of 120 g. of neutral alumina. Elution with benzene-hexane (1:4) produces, in the first 500 ml., about 827 mg. of the pure α-lactone (V) which is followed by elution with the same solvent mixture (5.5 l.) and on elution with benzene-hexane (1:1, 2 l.) by a total of about 2.9 g. of material, representing a mixture of α- and β-lactone melting at about 158–160°. Continued elution of the column with benzene (9 l.) yields a total of about 1.2 g. of material which after recrystallization ethanol constitutes pure 3β-acetoxy-24-hydroxy-Δ$^{8,24}$-lanostadiene-21-oic acid lactone (β-lactone) (VI) (about 404 mg.) possessing the following properties: M.P. about 190–191°; [α]$_D^{23}$ +64° (C, .87 in chlf.);

$\lambda_{max.}^{Nujol}$ 5.70, 5.79, 5.97, (weak), 8.08, 11.50, 11.50, 11.80 and 13.50μ

The 11.80μ band is absent in the α-lactone.

*Analysis.*—Calcd. for C$_{32}$H$_{48}$O$_4$ (496.70): C, 77.37; H, 9.73. Found: C, 77.56; H, 9.73.

EXAMPLE 8

Treating the 3β,16α-diacetoxy-24-keto-Δ$^8$-lanostene-21-oic acid (XLIV) obtained in Example 3, in accordance with the procedures set forth in Example 7 above, yields 3β,16α-diacetoxy-24-keto-Δ$^{8,23}$-lanostadiene - 21 - oic acid lactone (α-lactone) (XLV) and 3β,16α-diacetoxy-24-hydroxy-Δ$^8$-24-lanostene-21-oic acid lactone (β-lactone) (XLVI).

EXAMPLE 9

Treating the 16α-acetoxy-3,24-diketo-dehydroeburicoic acid (LXXX) obtained in Example 4 above, according to the procedure set forth in Example 7, yields 16α-acetoxy-3,24-diketo-Δ$^{7,9(11),23}$-lanostatriene-21-oic acid lactone (α-lactone) (LXXXI) and 16α-acetoxy-3,24-diketo-Δ$^{7,9(11),24}$-lanostatriene-21-oic acid lactone (β-lactone) (LXXXII).

EXAMPLE 10

*3β-Acetoxy-24-Hydroxy-Δ$^{8,20(22),23}$-Lanostatriene-21-Oic Acid Lactone (α-Pyrone) (VII)*

A suspension of 180 mg. of 10% palladium on charcoal in 25 ml. of p-cymene is distilled until approximately 3 ml. of solvent have been removed. The final temperature of the vapors is over 170°. 250 mg. of the thoroughly dried α-enol lactone (V) is then added and the resulting suspension heated under reflux with stirring for 2 hours under a blanket of nitrogen. The mixture is cooled, filtered and the solvent removed in vacuo. The residual crystalline material on recrystallization from absolute ethanol furnishes the pure α-pyrone (VI) in about 75% yield possessing the following properties: M.P. about 228–228.5°; [α]$_D^{23}$ −114° (chlf.);

$\lambda_{max.}^{alc.}$ 305 mμ (ε=8,850); $\lambda_{max.}^{Nujol}$ 5.79, 5.90, 6.11, 6.35, 8.95, 11.90 and 12.69μ

*Analysis.*—Calcd. for C$_{32}$H$_{46}$O$_4$ (494.68): C, 77.69; H, 9.37. Found: C, 77.77; H, 9.43.

When the β-enol lactone (VI) is substituted for the α-lactone (V) in Example 6 and the reaction time is prolonged to 6 hours, the pyrone (VII) is obtained in about 60% yield. Moreover, when a mixture of α- and β-enol lactones (V and VI) (80 g.) is dehydrogenated with 80 g. of 10% palladium on charcoal in 700 ml. of p-cymene for 6 hours, about 50 g. of the pure α-pyrone (VII) of M.P. about 226–228° is obtained.

Furthermore, if another ester of eburicoic acid, such as the 3-propionate (II), the 3-butyrate or the 3-benzoate is substituted for the 3-acetate in the procedures of either Example 2 or Example 5 and the procedures of Examples 2 through 10 are carried out, the corresponding 3-esters are obtained.

EXAMPLE 11

Treating the 3β,16α-diacetoxy lactones (XLV and XLVI) obtained in Example 8, in accordance with the procedure set forth in Example 10 above, yields 3β,16α-diacetoxy 24-hydroxy-Δ$^{8,20(22),23}$-lanostatriene-21-oic acid lactone (α-pyrone) (XLVII).

EXAMPLE 12

Treating the 16α-acetoxy lactones (LXXXI) and (LXXXII) obtained in Example 9, in accordance with the procedures set forth in Example 10 above, yields 16α-acetoxy-3,24-diketo-Δ$^{7,9(11),20(22),23}$ - lanostatetraene - 21 - oic acid lactone (α-pyrone) (LXXXIII).

EXAMPLE 13

*3β,24-Dihydroxy-Δ$^{8,20(22),23}$-Lanostatriene-Oic Acid Lactone (VIII)*

To a solution of 510 mg. of potassium hydroxide in 10 ml. of ethylene glycol is added 73 mg. of the finely ground α-pyrone acetate (VII). The suspension is stirred and immersed in an oil bath held at a temperature of 150°. After 5 minutes there results a clear pale yellow solution which is heated for an additional 4 minutes and then cooled. 25 ml. of water is added and the mixture extracted with ether. The ether extract is washed with saturated sodium chloride solution, dried over sodium sulfate and evaporated to dryness in vacuo. About 60 mg. of crystalline residue is obtained which on recrystallization from acetone furnishes long needles of the α-pyrone 3-ol (VIII) possessing the following properties: M.P. 254–255°;

$\lambda_{max.}^{alc.}$ 303 mμ (ε=9,000); $\lambda_{max.}^{Nujol}$ 2.74, 2.86, 5.87, 6.09, 6.33, 11.85 and 12.62μ

*Analysis.*—Calcd. for C$_{30}$H$_{44}$O$_3$ (452.65): C, 79.60; H, 9.80. Found: C, 79.50; H, 9.83.

EXAMPLE 14

Treating the α-pyrone diacetate (XLVII) obtained in Example 11, according to the procedures set forth in Example 14, yields 3β,16α,24-trihydroxy-Δ$^{8,20(22),23}$-lanostatriene-21-oic acid lactone (XLVIII).

EXAMPLE 15

Treating the α-pyrone acetate (LXXXIII) obtained in Example 12, according to the procedures set forth in Example 14, yields 16α-hydroxy-3,24-diketo-Δ$^{7,9(11),20(22),23}$-lanostatetraene-21-oic acid lactone (LXXXIV).

EXAMPLE 16

24-Hydroxy-3-Keto-Δ$^{8,20(22),23}$-Lanostatriene-21-Oic Acid Lactone

To a solution of 95 mg. of 3β,24-dihydroxy-Δ$^{8,20(22),23}$-lanostadiene-21-oic acid lactone (VIII) in 3 ml. of acetone is added 1 ml. of a 90% aqueous acetone solution of 20 mg. of chromium trioxide and 32 mg. of concentrated sulfuric acid. After 10 minutes methanol is added to reduce excess chromium trioxide and the solution is diluted with water and extracted with chloroform. The chloroform extract is dried over sodium sulfate and evaporated to dryness in vacuo. The crystalline residue on recrystallization from acetonitrile produces the analytically pure 3-ketone possessing the following properties: M.P. about 230–232°;

$\lambda_{max.}^{Nujol}$ 5.87, 6.08, 6.30, 12.02 and 12.63μ

*Analysis.*—Calcd. for $C_{30}H_{42}O_3$ (415.63): C, 79.95; H, 9.39. Found: C, 80.21; H, 9.54.

EXAMPLE 17

3β-Acetoxy-24-Hydroxy-Δ$^{7,20(22),23}$-Lanostatriene-21-Oic Acid Lactone (IX)

A solution of 5 g. of 3β-acetoxy-24-hydroxy-Δ$^{8,20(22),23}$-lanostatriene-21-oic acid lactone (VII) in 350 ml. of glacial acetic acid is saturated with dry hydrogen chloride gas first at 10° and finally as more HCl dissolves at 0°. This requires a total of 30 minutes. The solution is maintained for an additional hour at 0° and then evaporated to dryness in vacuo. The resulting crystalline residue on recrystallization from 95% ethanol and chloroform furnishes about 3.75 g. (75%) of a mixture consisting largely of the Δ$^7$- and some of the Δ$^8$-isomer, M.P. 229–231°; $[\alpha]_D^{23}$ −135° (chlf.). A sample of this product is chromatographed on acid-washed alumina using a 100:1 ratio of alumina to sample. After elution of the Δ$^8$-isomer with chloroform-benzene (1:8) the main fraction is eluted with pure chloroform to give the pure Δ$^7$-isomer (IX), which on recrystallization from methanol has the following properties: M.P. 230–230.5°; $[\alpha]_D^{23}$ −144° (chlf.).

*Analysis.*—Calcd. for $C_{32}H_{46}O_4$ (494.68): C, 77.69; H, 9.37. Found: C, 77.92; H, 9.40.

$\lambda_{max.}^{Nujol}$ essentially identical with the Δ$^8$-isomer VII except for the presence of a medium band at 12.05μ, which is weak in the latter.

EXAMPLE 18

Treating the α-pyrone diacetate (XLVII) obtained in Example 11 according to the procedures set forth in Example 17 yields 3β,16α-diacetoxy-24-hydroxy-Δ$^{7,20(22),23}$-lanostatriene-21-oic acid lactone (XLIX).

EXAMPLE 19

3β-Hydroxy-24-Keto-Δ$^{7,20(22),23}$-Lanostatriene-21-Oic Acid Lactone (X)

Following the procedure of Example 17 but substituting 5 g. of 3β-hydroxy-24-keto-Δ$^{8,20(22),23}$-lanostatriene-21-oic acid lactone (VIII) for the acetate (VII), 3β-hydroxy-24-keto-Δ$^{7,20(22),23}$-lanostatriene-21-oic acid lactone (X) is obtained.

EXAMPLE 20

3β-21-Dihydroxy-Δ$^{8,20(22),23}$-Lanostatriene (XI)

A solution of 5 g. of the α-pyrone (VII) in 210 ml. of freshly distilled tetrahydrofuran is added over a 15-minute period to a refluxing solution of 5 g. of lithium aluminum hydride in 125 ml. of tetrahydrofuran with stirring under a blanket of nitrogen. Reflux is continued for an additional 2 hours and the solution is cooled to room temperature. Saturated sodium sulfate solution is then added carefully until all the lithium aluminum hydride is decomposed, after which the reaction mixture is shaken with several 200 ml. portions of benzene and the resulting extracts decanted from the inorganic salts until all the organic material is extracted. The benzene-tetrahydrofuran solution is dried over sodium sulfate and evaporated to dryness in vacuo. The resulting residue (about 4.6 g.) is dissolved in 100 ml. of benzene and the solution chromatographed on 100 g. of neutral alumina washing the column with 800 ml. of benzene to remove some impurities. The desired trienediol (XI) is obtained by elution with 2800 ml. of 10% chloroform in benzene. The combined eluates are evaporated to dryness and recrystallized from ether, which results in about 2.06 of the pure trienediol XI possessing the following properties: M.P. about 166–168°; $[\alpha]_D^{23}$ +68° (chlf.);

$\lambda_{max.}^{alc.}$ 244 mμ (ε=32,800); $\lambda_{max.}^{Nujol}$ 3.10, 9.71, and 10.40μ

*Analysis.*—Calcd. for $C_{30}H_{48}O_2$ (440.68): C, 81.76; H, 10.98. Found: C, 81.63; H, 10.91.

Continued elution of the alumina column with chloroform (1 l.) elutes about 200 mg. of crystalline material which after recrystallization from acetone has the following properties: M.P. about 199–200°; $[\alpha]_D^{23}$ +37° (c., .96 in chlf.);

$\lambda_{max.}^{alc.}$ no selective absorption; $\lambda_{max.}^{Nujol}$ 3.00μ

*Analysis.*—Calcd. for $C_{30}H_{52}O_3$ (416.72): C, 78.20; H, 11.38. Found: C, 77.92, 78.25; H, 11.12, 11.33.

This compound represents 3β,21,24-trihydroxy-Δ$^8$-lanostene.

EXAMPLE 21

Treating the α-pyrone (XLVII) obtained in Example 11, according to the procedures set forth in Example 20, yields 3β,16α,21-trihydroxy-Δ$^{8,20(22),23}$-lanostatriene (LI).

EXAMPLE 22

Treating the α-pyrone (LXXXIII) obtained in Example 12, according to the procedures set forth in Example 20, yields 3,16α,21-trihydroxy-Δ$^{7,9(11),20(22),23}$-lanostatetraene (LXXXV).

EXAMPLE 23

3β,21-Diacetoxy-Δ$^{8,20(22),23}$-Lanostatriene (XII)

A solution of 200 mg. of the triene (XI) in 2 ml. of anhydrous pyridine and 0.2 ml. of acetic anhydride is allowed to stand at room temperature overnight. Removal of the reagents in vacuo leaves a residue which on crystallization from methanol furnishes the pure diacetate (XII) possessing the following properties; M.P. about 131–132°; $[\alpha]_D^{23}$ +87° (chlf.);

$\lambda_{max.}^{alc.}$ 242 mμ (ε=32,100); $\lambda_{max.}^{Nujol}$ 5.74, 8.02, 8.19, 9.86μ

*Analysis.*—Calcd. for $C_{34}H_{52}O_4$ (524.75): C, 77.82; H, 9.99. Found: C, 77.75; H, 10.01.

Similarly, if other acylating agents, such as propionic anhydride, butyric anhydride and benzoyl chloride, are substituted for the acetic anhydride in the procedure of Example 12, the corresponding diesters are formed.

EXAMPLE 24

Treating the triene (LI) obtained in Example 21, in accordance with the procedures of Example 23, yields 3β,16α,21-triacetoxy-Δ$^{8,20(22),23}$-lanostatriene (LII).

EXAMPLE 25

Treating the tetraene (LXXXV) obtained in Example 22, in accordance with the procedures of Example 23, yields 3,16α,21 - triacetoxy-$Y^{7,9(11),20(22),23}$-lanostatetraene (LXXXVI).

EXAMPLE 26

3β,21-Dihydroxy-$\Delta^{8,20(22)}$-Lanostadiene 46 mg. of the trienediol (XI) is hydrogenated in 5 ml. of absolute ethanol with 10 mg. of 5% palladium on charcoal. Within 6 minutes a sharp break corresponding to the uptake of 1 mole equivalent of hydrogen occurs, at which time the reaction is interrupted. The catalyst is filtered off and the solvent evaporated in vacuo. The dihydro derivative crystallizes from methanol containing a trace of water and has the following properties: m.p. about 145–147°.

Analysis.—Calcd. for $C_{30}H_{50}O_2$ (442.70): C, 81.39; H, 11.38. Found: C, 81.35; 11.41.

EXAMPLE 27

3β-Acetoxy-21-Hydroxy-$\Delta^{8,20(22),23}$-Lanostatriene (XIII)

To a solution of 50 mg. of 3β,21-dihydroxy-$\Delta^{8,20(22),23}$-lanostatriene (XII) in 20 ml. of methanol is added with stirring under nitrogen 0.2 ml. of 10% oxygen-free potassium carbonate. After two hours at room temperature 0.02 ml. of glacial acetic acid is added and after the addition of water the methanol is removed in vacuo. The mixture is extracted with chloroform, the chloroform extract washed with water, dried over sodium sulfate and evaporated to dryness in vacuo. The resulting residue of the 21-hydroxy compounds XIII is recrystallized from acetone-hexane.

EXAMPLE 28

Treating the triene (LII) obtained in Example 24, in accordance with the procedures set forth in Example 27, yields 3β-acetoxy-16α,21dihydroxy-$\Delta^{8,20(22)}$,23-lanostatriene (LIII).

EXAMPLE 29

Treating the tetraene (LXXXVI) obtained in Example 25, in accordance with the procedures set forth in Example 27, yields 3-acetoxy-16α,21-dihydroxy-$\Delta^{7,9(11),20(22),23}$-lanostatetraene (LXXXVII).

EXAMPLE 30

3β,16α-Dihydroxy-21-Acetoxy-$\Delta^{8,20(22),23}$-Lanostatriene

The 3β,16α,21-trihydroxy - $\Delta^{8,20(22),23}$ - lanostatriene (1 mmole) (LI) obtained in Example 21, is monoacetylated with a solution of 1.1 mmole of acetic anhydride in pyridine at room temperature. The reagents are evaporated in vacuo and the crystalline residue is recrystallized from methanol. After two crystallizations, 3β,16α-dihydroxy - 21 - acetoxy-$\Delta^{8,20(22),23}$-lanostatriene is obtained (LIV).

EXAMPLE 31

3,16α-Dihydroxy-21-Acetoxy-$\Delta^{7,9(11),20(22),23}$-Lanostateraene

Substituting the 3,16α,21 - trihydroxy - $\Delta^{7,9(11),20(22),23}$-lanostatetraene (LXXXV) obtained in Example 22 for the 3β,16α,21-trihydroxy-$\Delta^{8,20(22),23}$-lanostatriene of Example 30, 3,16α-dihydroxy - 21 - acetoxy-$\Delta^{7,9(11)20(22)}$-lanostatetraene (LXXXVII) is obtained by following the procedures of Example 30.

EXAMPLE 32

3β,21-Dihydroxy-$\Delta^{7,20(22),23}$-Lanostatriene (XIV)

Following the procedure of Example 20, but substituting 5 g. of the α-pyrone (IX) for the α-pyrone (VII), 3β,21-dihydroxy-$\Delta^{7,20(22),23}$-lanostatriene (XIV) is obtained.

EXAMPLE 33

Treating the 3β,16α-diacetoxy - 24 - hydroxy-$\Delta^{7,20(22),23}$-lanostatriene-21-oic acid lactone (XLIX) obtained in Example 18 in accordance with the procedures set forth in Example 20, yields 3β,16α,21 - trihydroxy - $\Delta^{7,20(22),23}$-lanostatriene (LV).

EXAMPLE 34

3β,21-Diacetoxy-$\Delta^{7,20(22),23}$-Lanostatriene (XV)

Following the procedure of Example 23, but substituting 200 mg. of the triene (XIV) for the triene (XI), 3β,21-diacetoxy-$\Delta^{7,20(22),23}$-lanostatriene (XV) is obtained.

EXAMPLE 35

Treating the 3β,16α,21-trihydroxy-$\Delta^{7,20(22),23}$-lanostatriene (LV) obtained in Example 33 according to the procedure set forth in Example 27 yields 3β,16α,21-triacetoxy-$\Delta^{7,20(22),23}$-lanostatriene (LVI).

EXAMPLE 36

Treating the 3β,16α,21 - triacetoxy - $\Delta^{7,20(22),23}$-lanostatriene (LVI) obtained in Example 35, according to the procedures set forth in Example 27 yields 3β-acetoxy-16α,21-dihydroxy-$\Delta^{7,20(22),23}$-lanostatriene (LVII).

EXAMPLE 37

3β-Acetoxy-21-Hydroxy-$\Delta^{7,20(22),23}$-Lanostatriene (XVI)

Following the procedure of Example 27 but substituting 50 mg. of the triene (XV) for the triene (XII), 3β-acetoxy-21-hydroxy-$\Delta^{7,20(22),23}$-lanostatriene (XVI) is obtained.

EXAMPLE 38

Treating the 3β,16α,21-trihydroxy-$\Delta^{7,20(22),23}$-lanostatriene (LV) obtained in Example 33, according to the procedure set forth in Example 30, yields 3β,16α-dihydroxy-21-acetoxy-$\Delta^{7,20(22),23}$-lanostatriene (LVIII).

EXAMPLE 39

3β,21-Dihydroxy-4,4,14α-Trimethyl-$\Delta^8$-5α-Pregnene-20-one (XVII)

A solution of 232 mg. of the trienediol (XI) in 40 ml. of ethyl acetate is ozonized at −20° with 2.1 mole equivalents of ozone (.81 liter of gas per mmole of ozone). The resulting ozonide is decomposed at room temperature by the addition of .4 ml. of glacial acetic acid and 2 g. of zinc dust (in portions). The mixture is stirred for 2½ hours when it no longer gives a positive test with potassium iodide starch reagent. The solution is filtered and washed with sodium chloride solution, dried over sodium sulfate and the solvent removed in vacuo. A crystalline residue remains, which on recrystallization from methanol furnishes about 77 mg. of the ketal (XVII) melting at about 214–216°. Crystallization from the same solvent furnishes the pure compound possessing the following properties: M.P. about 220–221° $[\alpha]_D^{23}+113°$ (CHCl$_3$);

$\lambda_{max.}^{Nujol}$ 2.80, 5.88μ

Analysis.—Calcd. for $C_{24}H_{38}O_3$ (374.54): C, 76.96; H, 10.23. Found: C, 76.85; H, 10.20.

EXAMPLE 40

Treating the 3β,16α,21-trihydroxy-$\Delta^{8,20(22),23}$-lanostatriene (LI) obtained in Example 21, according to the procedure set forth in Example 39, yields 3β,16α,21-trihydroxy-4,4,14α-trimethyl-$\Delta^8$-5α-pregnene-20-one (LIX).

EXAMPLE 41

Treating the 3,16α,21 - trihydroxy-$\Delta^{7,9(11),20(22),23}$-lanostatetraene (LXXXV) obtained in Example 22, according to the procedures set forth in Example 39, yields 3,16α,21-trihydroxy-4,4,14α-trimethyl-$\Delta^{7,9(11)}$ - 5α - pregnadiene-20-one (LXXXIX).

EXAMPLE 42

3β,21-Diacetoxy-4,4,14α-Trimethyl-Δ⁸-5α-Pregnene-20-One (XVIII)

100 mg. of the trienediol diacetate (XII) is dissolved in 10 ml. of ethyl acetate and ozonized at −25° with 3 mole equivalents of ozone. To the resulting solution are added at room temperature a few drops of acetic acid and then portionwise a total of 1 g. of zinc dust until a negative starch iodide test is observed, which requires about 3 hours. The mixture is then filtered, washed with a saturated salt solution, dried over sodium sulfate and evaporated to dryness in vacuo. A crystalline residue (about 82 mg.) is obtained, which on recrystallization from methanol yields about 37 mg. of material melting at about 182–184°. Further crystallization from menthanol furnishes analytical material possessing the following properties: M.P. about 187–188.5°; $[\alpha]_D^{23}$ +101° (c., .22 in chlf.); $\lambda_{max.}^{Nujol}$ 5.73 (shoulder), 5.78, 8.03, 9.30, 9.70, and 9.88μ

*Analysis.*—Calcd. for $C_{28}H_{42}O_5$ (458.61): C, 73.32; H, 9.23. Found: C, 73.10; H, 9.02.

EXAMPLE 43

Treating the 3β,16α,21-triacetoxy-Δ⁸,²⁰⁽²²⁾,²³-lanostatriene (LII) obtained in Example 24, according to the procedure set forth in Example 42, yields 3β,16α,21-triacetoxy-Δ⁸-5α-pregnene-20-one (LX).

EXAMPLE 44

Treating the 3,16α,21-triacetoxy-Δ⁷,⁹⁽¹¹⁾,²⁰⁽²²⁾,²³-lanostatetraene (LXXXVI) obtained in Example 25, according to the procedures set forth in Example 42, yields 3,16α,21-triacetoxy-4,4,14α-Δ⁷,⁹⁽¹¹⁾-5α-pregnadiene-20-one (LXL).

EXAMPLE 45

3β-Hydroxy-21-Acetoxy-4,4,14α-Trimethyl-Δ⁸-5α-Pregnene-20-One (XIX)

17.3 mg. of the diol (XVII) is monoacetylated with 2 ml. of a solution of acetic anhydride in pyridine containing 1.1 mole equivalent of acetic anhydride at room temperature for 18 hours. The reagents are evaporated in vacuo and the crystalline residue is recrystallized from methanol. After two crystallizations the 21-monoacetate (XIX) is obtained possessing the following properties: M.P. about 191–192°.

*Analysis.*—Calcd. for $C_{26}H_{40}O_4$ (416.58): C, 74.97; H, 9.70. Found: C, 74.97; H, 9.48.

EXAMPLE 46

Treating the 3β,16α,21-trihydroxy-4,4,14α-trimethyl-Δ⁸-5α-pregnene-20-one (LIX) obtained in Example 40 with 2.1 mole equivalent of acetic anhydride in pyridine according to the procedures set forth in Example 45, yields 16α,21 - diacetoxy - 3β - hydroxy-4,4,14α-trimethyl-Δ⁸-5α-pregnene-20-one.

EXAMPLE 47

Treating the 3,16α,21 - trihydroxy - 4,4,14α-trimethyl-Δ⁷,⁹⁽¹¹⁾-5α-pregnadiene-20-one (LXXXIX) obtained in Example 41 with 2.1 mole equivalents of acetic anhydride in pyridine according to the procedure set forth in Example 45, yields 16α,21-diacetoxy-3-hydroxy-4,4,14α-trimethyl-Δ⁷,⁹⁽¹¹⁾-5α-pregnadiene-20-one.

EXAMPLE 48

3β-Acetoxy-21-Hydroxy-4,4,14α-Trimethyl-Δ⁸-5α-Pregnene-20-One (XX)

To a solution of 45 mg. of the diacetate (XVIII) in 20 ml. of methanol is added with stirring under nitrogen .2 ml. of 10% oxygen-free potassium carbonate. After 2 hours at room temperature .02 ml. of glacial acetic acid is added and after the addition of water the methanol is removed in vacuo. The mixture is extracted with chloroform, the chloroform extract washed with water, dried over sodium sulfate and evaporated to dryness in vacuo. The resulting crystalline residue after recrystallization from methanol furnishes about 34 mg. of the pure 3-monoacetate (XX) possessing the following properties: M.P. about 202–204°; $[\alpha]_D^{23}$ +93° (c., .38 in chlf.)

*Analysis.*—Calcd. for $C_{26}H_{40}O_4$ (416.58): C, 74.96; H, 9.68. Found: C, 75.14; H, 9.64.

EXAMPLE 49

Treating the 3β,16α,21-triacetoxy-Δ⁸-5α-pregnene-20-one (LX) obtained in Example 43, in accordance with the procedure set forth in Example 48, yields a mixture of 3β - acetoxy - 16α,21 - dihydroxy-4,4,14-trimethyl-Δ⁸-5α-pregnene-20-one (LXI) and 3β,16α-diacetoxy-21-hydroxy-4,4,14α-trimethyl-Δ⁸-5α-pregnene-20-one (LXIII), which is separated by chromatography on silica gel.

EXAMPLE 50

Treating the 3,16α,21-triacetoxy-Δ⁷,⁹⁽¹¹⁾-5α-pregnadiene-20-one (LXL) obtained in Example 44 according to the procedures set forth in Example 48 yields a mixture of 3 - acetoxy - 16α,21-dihydroxy-4,4,14α-trimethyl-Δ⁷,⁹⁽¹¹⁾-50-pregnadiene-20-one (LXLI) and 3,16α-diacetoxy-20,21 - hydroxy-4,4,14α-trimethyl-Δ⁷,⁹⁽¹¹⁾-5α-pregnadiene-20-one (LXLIII) which is separated into the individual components by chromatography on silica gel.

EXAMPLE 51

Treating the 3β,16α-dihydroxy-21-actoxy-Δ⁸,²⁰⁽²²⁾,²³-lanostatriene (LIV) obtained in Example 30, according to the procedures set forth in Example 39 yields 3β,16α-dihydroxy - 21 - acetoxy-4,4,14α-trimethyl-Δ⁸-5α-pregnene-20-one (LXII).

EXAMPLE 52

Treating the 3,16α-dehydroxy-21-acetoxy-Δ⁷,⁹⁽¹¹⁾,²⁰⁽²²⁾,²³ lanostatetraene (LXXXVIII) obtained in Example 31, according to the procedures set forth in Example 39 yields 3,16α - dihydroxy - 21-acetoxy-4,4,14α-trimethyl-Δ⁷,⁹⁽¹¹⁾-5α-pregnadiene-20-one (LXLII).

EXAMPLE 53

3β,21-Dihydroxy-4,4,14α-Trimethyl-Δ⁷-5α-Pregnene-20-One (XXI)

Following the procedure of Example 39 but substituting 232 mg. of the trienediol (XIV) for the trienediol (XI), 3β,21-dihydroxy-4,4,14α-trimethyl-Δ⁷-5α-pregnene-20-one (XXI) is obtained.

EXAMPLE 54

Treating the 3β,16α,21-trihydroxy-Δ⁷,²⁰⁽²²⁾,²³-lanostatriene (LV) obtained in Example 33, in accordance with the procedures set forth in Example 39, yields 3β,16α,21-trihydroxy - 4,4,14α - trimethyl - Δ⁷-5α-pregnene-20-one (LXIV).

EXAMPLE 55

3β,21-Diacetoxy-4,4,14α-Trimethyl-Δ⁷-5α-Pregnene-20-One (XXII)

Following the procedure of Example 42, but substituting 100 mg. of the trienediol diacetate (XV) for the trienediol diacetate (XII), 3β,21-diacetoxy-4,4,14α-trimethyl-Δ⁷-5α-pregnene-20-one (XXII) is obtained.

EXAMPLE 56

Treating the 3β,16α,21-triacetoxy-Δ⁷,²⁰⁽²²⁾,²³-lanostatriene (LVI) obtained in Example 35, according to the procedures set forth in Example 42 yields 3β,16α,21-triacetoxy-4,4,14α-trimethyl-Δ⁷-5α-pregnene-20-one (LXV).

EXAMPLE 57

3β-Hydroxy-21-Acetoxy-4,4,14α-Trimethyl-Δ⁷-5α-Pregnene-20-One (XXIII)

Following the procedure of Example 45 but substituting 17.3 mg. of the diol (XXI) for the diol (XVII), 3β-hydroxy-21-acetoxy-4,4,14α-trimethyl-Δ⁷-5α-pregnene-20-one (XXIII) is obtained.

Moreover, if another acylating agent, such as propionic anhydride, butyric anhydride and benzoyl chloride, is substituted for the acetic anhydride in the procedure of either Example 45 or Example 57, the corresponding 21-esters are obtained.

EXAMPLE 58

Treating the 3β,16α,21-trihydroxy-4,4,14α-trimethyl-Δ⁷-5α-pregnene-20-one (LXIV) obtained in Example 54 with 2.1 mole equivalents of acetone anhydride in pyridine according to procedures set forth in Example 45 yields 16α,21-diacetoxy-3β-hydroxy-4,4,14α-trimethyl-Δ⁷-5α-pregnene-20-one (LXVIII).

EXAMPLE 59

3β-Acetoxy-21-Hydroxy-4,4,14α-Trimethyl-Δ⁷-5α-Pregnene-20-One (XXIV)

Following the procedure of Example 48 but substituting 45 mg. of the diacetate (XXII) for the diacetate (XVIII), 3β-acetoxy-21-hydroxy-4,4,14α-trimethyl-Δ⁷-5α-pregnene-20-one (XXIV) is obtained.

EXAMPLE 60

Treating the 3β,16α,21-triacetoxy-4,4,14α-trimethyl-Δ⁷-5α-pregnene-20-one (LXV) obtained in Example 56, according to the procedures set forth in Example 48 yields a mixture of 3β-acetoxy-16α,21-dihydroxy-4,4,14α-trimethylΔ⁷-5α-pregnene-20-one (LXVI) and 3β,16α-acetoxy-21-hydroxy-4,4,14α-trimethyl-Δ⁷-5α-pregnene-20-one (LXVIII) which is separated into individual components by chromatography on silica gel.

EXAMPLE 61

21-Acetoxy-4,4,14α-Trimethyl-Δ⁸-5α-Pregnene-3,20-Dione (XXVI)

A solution of 6 mg. of the 21-acetate (XIX) in 1 ml. of acetone is oxidized with .14 ml. of a solution containing 20 mg. of chromium trioxide and 32 mg. of concentrated sulfuric acid per milliliter of 90% aqueous acetone. The reaction is allowed to proceed for 15 minutes when excess chromium trioxide is decomposed by the addition of methanol. Water and chloroform are added and the chloroform extract washed with water, dried over sodium sulfate and evaporated to dryness. The diketone (XXVI) crystallizes readily from methanol and melts at about 168–170°;

$\lambda_{max}^{Nujol}$ 5.71, 5.79, 5.88, 8.09μ

EXAMPLE 62

Treating the 3β,16α-dihydroxy-21-acetoxy-4,4,14α-trimethyl-Δ⁸-5α-pregnene-20-one (LXII) obtained in Example 51, according to the procedures set forth in Example 61, yields 21-acetoxy-4,4,14α-trimethyl-Δ⁸-5α-pregnene-3,16,20-trione (LXIX).

EXAMPLE 63

Treating the 3,16α-dihydroxy-21-acetoxy-4,4,14α-trimethyl-Δ⁷,⁹⁽¹¹⁾-5α-pregnadiene-20-one (LXLII) obtained in Example 52, according to the procedures set forth in Example 61, yields 21-acetoxy-4,4,14α-trimethyl-Δ⁷,⁹⁽¹¹⁾-5α-pregnadiene-3,16,20-trione (LXLIV).

EXAMPLE 64

21-Hydroxy-4,4,14α-Trimethyl-Δ⁸-5α-Pregnene-3,20-Dione (XXV)

To a solution of 45 mg. of the acetate (XXVI) in 20 ml. of methanol is added with stirring under nitrogen 0.2 ml. of 10% oxygen-free potassium carbonate. After two hours at room temperature, 0.02 ml. of glacial acetic acid is added and after the addition of water the methanol is removed in vacuo. The mixture is then extracted with chloroform, the chloroform extract washed with water, dried over sodium sulfate and evaporated to dryness in vacuo to yield a residue of the 21-alcohol (XXV).

EXAMPLE 65

Treating the 21-acetoxy-4,4,14α-trimethyl-Δ⁸-5α-pregnene-3,16,20-trione (LXIX) obtained in Example 62 according to the procedures set forth in Example 64, yields 21-hydroxy-4,4,14α-trimethyl-Δ⁸-5α-pregnene-3,16,20-trione (LXX).

EXAMPLE 66

Treating the 21-acetoxy-4,4,14α-trimethyl-Δ⁷,⁹⁽¹¹⁾-5α-pregnadiene-3,16,20-trione (LXLIV), obtained in Example 63, according to the procedures set forth in Example 64 yields 21-hydroxy-4,4,14α-trimethyl-Δ⁷,⁹⁽¹¹⁾-5α-pregnadiene-3,16,20-trione (LXLV).

EXAMPLE 67

21-Acetoxy-4,4,14α-Trimethyl-Δ⁷-5α-Pregnene-3,20-Dione (XXVIII)

Following the procedure of Example 61 but substituting 6 mg. of the 21-acetate (XXIII) for the 21-acetate (XIX), 21-acetoxy-4,4,14α-trimethyl-Δ⁷-5α-pregnene-3,20-dione (XXVIII) is obtained.

EXAMPLE 68

Treating the 3β,16α-dihydroxy-21-acetoxy-4,4,14α-trimethyl-Δ⁷-5α-pregnene-20-one (LXVIII) obtained in Example 60 according to the procedures set forth in Example 61 yields 21-acetoxy-4,4,14α-trimethyl-Δ⁷-5α-pregnene-3,16,20-trione (LXXI).

EXAMPLE 69

21-Hydroxy-4,4,14α-Trimethyl-Δ⁷-5α-Pregnene-3,20-Dione (XXVII)

Following the procedure of Example 27 but substituting 45 mg. of the acetate (XXVIII) for the acetate (XXVI), 21-hydroxy-4,4,14α-trimethyl-Δ⁷-5α-pregnene-3,20-dione (XXVII) is obtained.

The free 21-hydroxy compounds (XXV) and (XXVII) can be converted to any other 21-ester of this invention by substituting the desired 21-hydroxy compound for the diol (XVII) in the procedure of Example 20 and any desired acylating agent for the acetic anhydride. Thus propionic anhydride gives the 21-propionic acid ester derivatives; butyric anhydride, the 21-butyric acid ester derivatives; benzoyl chloride, the 21-benzoic acid ester derivatives; and cyclohexane carbonyl chloride, the 21-cyclohexane carboxylic acid ester derivatives.

EXAMPLE 70

Treating the 21-acetoxy-4,4,14α-trimethyl-Δ⁷-5α-pregnene-3,16,20-trione (LXXI) obtained in Example 68, according to the procedures set forth in Example 64 yields 21-hydroxy-4,4,14α-trimethyl-Δ⁷-5α-pregnene-3,16,20-trione (LXXII).

EXAMPLE 71

3β-Acetoxy-21-Mesyloxy-4,4,14α-Trimethyl-Δ⁸-5α-Pregnene-20-One (XXIX)

To a solution of 38 mg. of the 3β-monoacetate (XX) in 1 ml. of anhydrous pyridine is added at 0° .055 ml. of methanesulfonyl chloride in .5 ml. of chloroform. The reaction is allowed to remain at 0° for 2¾ hours, after which it is stopped by the addition of a small amount of ice. Chloroform and water are added and after separation of the phases the chloroform solution is washed with dilute sulfuric acid, water and then with dilute sodium bicarbonate keeping the extract cool at all times. The chloroform extract is dried over sodium sulfate, filtered and evaporated to dryness in vacuo leaving the 21-mesylate (XXIX) as a crystalline residue melting at about 109–110°.

EXAMPLE 72

Treating the 3β,16α-diacetoxy-21-hydroxy-4,4,14α-trimethyl-Δ⁸-5α-pregnene-20-one (LXIII) obtained in Example 49, according to the procedures set forth in Example 71, yields 3β,16α-diacetoxy-21-mesyloxy-4,4,14α-trimethyl-Δ⁸-5α-pregnene-20-one.

EXAMPLE 73

Treating the 3,16α-diacetoxy-21-hydroxy-4,4,14α-trimethyl-Δ⁷,⁹⁽¹¹⁾-5α-pregnadiene-20-one (LXLIII) obtained in Example 50 according to the procedures set forth in Example 71, yields 3,16α-diacetoxy-21-mesyloxy-4,4,14α-trimethyl-Δ⁷,⁹⁽¹¹⁾-5α-pregnadiene-20-one.

EXAMPLE 74

*21-Mesyloxy-4,4,14α-Trimethyl-Δ⁸-5α-Pregnene-3,20-Dione (XXX)*

Following the procedure of Example 71 but substituting 36 mg. of the 3-ketone (XXV) for the 3-monoacetate (XX), 21 - mesyloxy - 4,4,14α-trimethyl-Δ⁸-5α-pregnene-3,20-dione (XXX) is obtained.

EXAMPLE 75

Treating the 21-hydroxy-4,4,14α-trimethyl-Δ⁸-5α-pregnene-3,16,20-trione (LXX) obtained in Example 65, in accordance with the procedure set forth in Example 71, yields 21-mesyloxy-4,4,14α-trimethyl-Δ⁸-5α-pregnene-3,16,20-trione.

EXAMPLE 76

Treating the 21-hydroxy-4,4,14α-trimethyl-Δ⁷,⁹⁽¹¹⁾-5α-pregnadiene-3,16,20-trione (LXLV) obtained in Example 66, according to the procedures set forth in Example 71, yields 21-mesyloxy-4,4,14α-trimethyl-Δ⁷,⁹⁽¹¹⁾-5α-pregnadiene-3,16,20-trione.

EXAMPLE 77

*3β-Acetoxy-21-Mesyloxy-4,4,14α-Trimethyl-Δ⁷-5α-Pregnene-20-One (XXXI)*

Following the procedure of Example 71 but substituting 38 mg. of the 3β-monoacetate (XXIV) for the 3-monoacetate (XX), 3β - acetoxy-21-methyloxy-4,4,14α-trimethyl-Δ⁷-5α-pregnene-20-one (XXXI) is obtained.

EXAMPLE 78

Treating the 3β,16α-diacetoxy-21-hydroxy-4,4,14α-trimethyl-Δ⁷-5α-pregnene-20-one (LXVIII) obtained in Example 60, according to the procedures set forth in Example 71, yields 3β,16α-diacetoxy-21-mesyloxy-4,4,14α-trimethyl-Δ⁷-5α-pregnene-20-one.

EXAMPLE 79

*21-Mesyloxy-4,4,14α-Trimethyl-Δ⁷-5α-Pregnene-3,20-Dione (XXXII)*

Following the procedure of Example 71 but substituting 36 mg. of the 3-ketone (XXVII) for the 3-monoacetate (XX), 21-mesyloxy-4,4,14α-trimethyl-Δ⁷-5α-pregnene-3,20-dione (XXXII) is obtained.

EXAMPLE 80

Treating the 21-hydroxy-4,4,14α-trimethyl-Δ⁷-5α-pregnene-3,16,20-trione (LXXII) obtained in Example 70, according to the procedures set forth in Example 71, yields 21-mesyloxy-4,4,14α-trimethyl-Δ⁷-5α-pregnene-3,16,20-trione.

EXAMPLE 81

*3β-Acetoxy-21-Iodo-4,4,14α-Trimethyl-Δ⁸-5α-Pregnene-20-One (XXXIII)*

A solution of 47 mg. of the 21-mesylate (XXIX) and 120 mg. of sodium iodide in 1.5 ml. of acetone is refluxed for 10 minutes on the steam bath. Water is added and the mixture is extracted with chloroform. The chloroform extract is washed with water, dried over sodium sulfate and the solvent removed in vacuo. The dry residue represents the 21-iodo compound (XXXIII), M.P. about 146–149° (blackening at about 185°).

EXAMPLE 82

Treating the 3β,16α-diacetoxy-21-mesyloxy-4,4,14α-trimethyl-Δ⁸-5α-pregnene-20-one, obtained in Example 72 according to the procedures set forth in Example 81 yields, 3β,16α - diacetoxy - 21 - iodo - 4,4,14α - trimethyl - Δ⁸-5α-pregnene-20-one.

EXAMPLE 83

Treating the 3,16α-diacetoxy-21-mesyloxy-4,4,14α-trimethyl - Δ⁷,⁹⁽¹¹⁾ - trimethyl - Δ⁷,⁹⁽¹¹⁾ - 5α - pregnadiene-20-one, obtained in Example 73, according to the procedures set forth in Example 81, yields 3,16α-diacetoxy-21 - iodo - 4,4,14α - trimethyl - Δ⁷,⁹⁽¹¹⁾ - 5α - pregnadiene-20-one.

EXAMPLE 84

*21-Iodo-4,4,14α-Trimethyl-Δ⁸-5α-Pregnene-3,20-Dione (XXXIV)*

Following the procedure of Example 81 but substituting 45 mg. of the 21-mesylate (XXX) for the 21-mesylate (XXIX), 21-iodo-4,4,14α-trimethyl-Δ⁸-5α-pregnene-3,20-dione (XXXIV) is obtained.

EXAMPLE 85

Treating the 21-mesyloxy-4,4,14α-trimethyl-Δ⁸-pregnene-3,16,20-trione, obtained in Example 75, according to the procedures set forth in Example 81, yields 21-iodo-4,4,14α-trimethyl-Δ⁸-5α-pregnene-3,16,20-trione.

EXAMPLE 86

*3β-Acetoxy-21-Iodo-4,4,14α-Trimethyl-Δ⁷-5α-Pregnene-20-One (XXXV)*

Following the procedure of Example 81 but substituting 47 mg. of the 21-mesylate (XXXI) for the 21-mesylate (XXIX), 3β-acetoxy-21-iodo-4,4,14α - trimethyl - Δ⁷ - 5α-pregnene-20-one (XXXV) is obtained.

EXAMPLE 87

Treating the 3β,16α-diacetoxy-21-mesyloxy-4,4,14α-trimethyl-Δ⁷-5α-pregnene-20-one obtained in Example 78, according to the procedures set forth in Example 81, yields 3β,16α-diacetoxy-21-iodo-4,4,14α-trimethyl-Δ⁷-5α-pregnene-20-one.

EXAMPLE 88

*21-Iodo-4,4,14α-Trimethyl-Δ⁷-5α-Pregnene-3,20-Dione (XXXVI)*

Following the procedure of Example 81 but substituting 45 mg. of the 21-mesylate (XXXII) for the 21-mesylate (XXIX), 21-iodo-4,4,14α-trimethyl-Δ⁷-5α-pregnene-3,20-dione (XXXVI) is obtained.

EXAMPLE 89

Treating the 21-mesyloxy-4,4,14α-trimethyl-Δ⁷-5α-pregnene-3,16,20-trione obtained in Example 80, according to the procedures set forth in Example 81, yields 21-iodo-4,4,14α-trimethyl-Δ⁷-5α-pregnene-3,16,20-trione.

EXAMPLE 90

To a solution of 47 mg. of the iodo compound (XXXIII) in 1 ml. of dioxane is added .9 ml. of a 5% sodium bisulfite solution and the resulting mixture refluxed for 1 hour on the steam cone. Water and chloroform are added and after separation of the layers, the chloroform phase is washed with water, dried over sodium sulfate and evaporated to dryness in vacuo. The residual crystalline material (about 25.5 mg.) on recrystallization from methanol furnishes the pure pregnene derivative (XXXVII) possessing the following properties: M.P. about 166–167°; [α]$_D^{23}$ +107° (c., .44 in chlf.);

$\lambda_{max}^{KBr}$ 5.79, 5.85, 7.97μ

*Analysis.*—Calcd. for $C_{26}H_{40}O_3$ (400.58): C, 77.95; H, 10.07. Found: C, 76.89; H, 10.16.

EXAMPLE 91

Treating the 3β,16α-diacetoxy-21-iodo-4,4,14α-trimethyl-$\Delta^8$-5α-pregnene-20-one obtained in Example 82, according to the procedures set forth in Example 90, yields 3β,16α-diacetoxy - 4,4,14α - trimethyl-$\Delta^8$-5α-pregnene-20-one (LXXIII).

EXAMPLE 92

Treating the 3,16α-diacetoxy-21-iodo-4,4,14α-trimethyl-$\Delta^{7,9(11)}$-5α-pregnadiene - 20 - one obtained in Example 83, according to the procedures set forth in Example 90, yields 3,16α-diacetoxy - 4,4,14α-trimethyl-$\Delta^{7,9(11)}$-5α-pregnadiene-20-one (LXLVI).

EXAMPLE 93

*3β-Hydroxy-4,4,14α-Trimethyl-$\Delta^8$-5α-Pregnene-20-One (XXXVIII)*

To a solution of 15 mg. of the pregnene 3-acetate (XXXVII) in 4 ml. of 1 N ethanolic KOH is allowed to stand at room temperature for 19 hours. At the end of this period crystals appear in the solution. The mixture is neutralized with 1 N sulfuric acid, diluted with water, the ethanol removed in vacuo and the aqueous suspension extracted with chloroform. The chloroform extract is dried over sodium sulfate and evaporated to dryness in vacuo. There remains a crystalline residue (about 12 mg.) melting at about 240–245° which after recrystallization from acetone furnishes analytically pure XXXVIII melting at about 247–249°;

$\lambda_{max}^{KBr}$ 2.83, 5.86μ

EXAMPLE 94

Treating the 3β,16α-diacetoxy-4,4,14α-trimethyl-$\Delta^8$-5α-pregnene-20-one (LXXIII) obtained in Example 91, according to the procedures set forth in Example 93, yields 3β-hydroxy - 4,4,14α - trimethyl-$\Delta^{8,16}$-5α-pregnadiene-20-one (LXXIV).

EXAMPLE 95

Treating the 3,16α-diacetoxy-4,4,14α-trimethyl-$\Delta^{7,9(11)}$-5α-pregnadiene-20-one (LXLVI) obtained in Example 92, according to the procedures set forth in Example 93, yields 3-hydroxy - 4,4,14α-trimethyl-$\Delta^{7,9(11),16}$-5α-pregnatriene-20-one (LXLVII).

EXAMPLE 96

*4,4,14α-Trimethyl-$\Delta^8$-5α-Pregnene-3,20-Dione (IXL)*

To a solution of 12 mg. of the pregnene 3-ol (XXXVIII) in 8 ml. of reagent grade acetone is added with stirring .27 ml. of a solution containing 20 mg. of chromium trioxide and 32 mg. of sulfuric acid per milliliter of 90% acqueous acetone. The reaction is allowed to proceed for 15 minutes after which time it is stopped by the addition of a few drops of 95% ethanol. Water is added and the steroid extracted with chloroform. The chloroform extract is dried over sodium sulfate and evaporated to dryness in vacuo. There remains about 11 mg. of a crystalline residue, which after recrystallization from acetone produces the pure 3,20-diketo (IXL) possessing the following properties: M.P. about 203–204°;

$[\alpha]_D^{23}$ +136° (c., .52 in chlf.)

$\lambda_{max}^{KBr}$ 5.85μ

*Analysis.*—Calcd. for $C_{24}H_{36}O_2$ (356.53): C, 80.85; H, 10.18. Found: C, 80.74; H, 10.28.

EXAMPLE 97

Treating the 3β - hydroxy - 4,4,14α - trimethyl-$\Delta^{8,16}$-5α-pregnadiene-20-one (LXXIV) obtained in Example 94 according to the procedures set forth in Example 96 yields 4,4,14α - trimethyl - $\Delta^{8,16}$-5α - pregnadiene - 3,20 - dione (LXXV).

EXAMPLE 98

Treating the 3-hydroxy-4,4,14α-trimethyl-$\Delta^{7,9(11),16}$-5α-pregnatriene-20-one (LXLVII) obtained in Example 95, according to the procedures set forth in Example 96, yields 4,4,14α-trimethyl-$\Delta^{7,9(11),16}$-5α-pregnatriene - 3,20 - dione (LXLVIII).

EXAMPLE 99

Following the procedure of Example 90 but substituting 45 mg. of the iodo compound (XXXIV) for the iodo compound (XXXIII), 4,4,14α-trimethyl-$\Delta^8$-5α-pregnene-3,20-dione (IXL) is obtained.

EXAMPLE 100

Treating the 21-iodo-4,4,14α-trimethyl-$\Delta^7$-5α-pregnene-3,16,20-trione obtained in Example 89 according to the procedures set forth in Example 90 yields 4,4,14α-trimethyl-$\Delta^7$-5α-pregnene-3,16,20-trione (LXXVIII).

EXAMPLE 101

*3β-Acetoxy-4,4,14α-Trimethyl-$\Delta^7$-5α-Pregnene-20-One (XL)*

Following the procedure of Example 90 but substituting 47 mg. of the iodo compound (XXXV) for the iodo compound (XXXIII), 3β-acetoxy-4,4,14α-trimethyl-$\Delta^7$-5α-pregnene-20-one (XL) is obtained.

EXAMPLE 102

Treating the 3β,16α-diacetoxy-21-iodo-4,4,14α-trimethyl-$\Delta^7$-5α-pregnene-20-one obtained in Example 87 according to the procedures set forth in Example 90, yields 3β,16α-diacetoxy - 4,4,14α - trimethyl-$\Delta^7$-5α-pregnene-20-one (LXXVI).

EXAMPLE 103

*3β-Hydroxy-4,4,14α-Trimethyl-$\Delta^7$-5α-Pregnene-20-One (XLI)*

Following the procedure of Example 93 but substituting 15 mg. of the pregnene 3-acetate (XL) for the pregnene 3-acetate (XXXVII), 3β-hydroxy-4,4,14α-trimethyl-$\Delta^7$-5α-pregnene-20-one (XLI) is obtained.

EXAMPLE 104

Treating the 3β,16α-diacetoxy-4,4,14α-trimethyl-$\Delta^7$-5α-pregnene-20-one (LXXVI) obtained in Example 102 according to the procedure set forth in Example 93, yields 3β-hydroxy - 4,4,14α - trimethyl-$\Delta^{7,16}$-5α-pregnadiene-20-one (LXXVII).

EXAMPLE 105

*4,4,14α-Trimethyl-$\Delta^7$-5α-Pregnene-3,20-Dione (XLII)*

Following the procedure of Example 96 but substituting 12 mg. of the pregnene 3-ol (XLI) for the pregnene 3-ol (XXXVIII), 4,4,14α-trimethyl-$\Delta^7$-5α-pregnene - 3,20-dione (XLII) is obtained.

EXAMPLE 106

Treating the 3β - hydroxy - 4,4,14α - trimethyl-$\Delta^{7,16}$-5α-pregnadiene-20-one (LXXVII) obtained in Example 104 according to the procedures set forth in Example 96 yields 4,4,14α - trimethyl - $\Delta^{7,16}$-5α - pregnadiene - 3,20 - dione (LXXVIII).

EXAMPLE 107

Following the procedure of Example 90 but substituting 45 mg. of the iodo compound (XXXVI) for the iodo compound (XXXIII), 4,4,14α-trimethyl-$\Delta^7$-5α - pregnene-3,20-dione (XLII) is obtained.

EXAMPLE 108

Treating the 21-iodo-4,4,14α-trimethyl-$\Delta^7$-5α-pregnene-3,16,20-trione obtained in Example 89 according to the procedures set forth in Example 90 yields 4,4,14α-trimethyl-$\Delta^7$-5α-pregnene-3,16,20-trione (LXXVIII).

This invention may be variously otherwise embodied within the scope of the appended claims.

What is claimed is:
1. A compound selected from the group consisting of steroids of the formulae

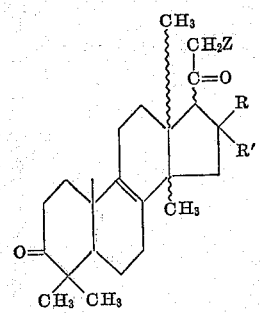 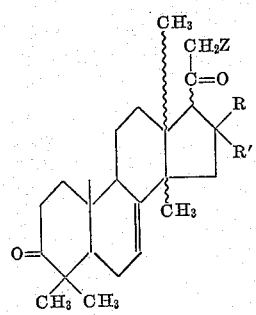

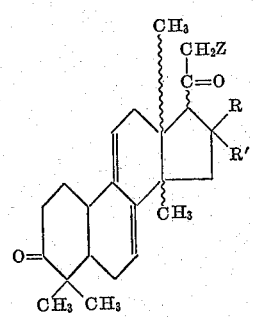 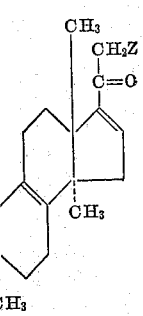

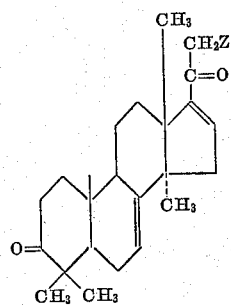 and 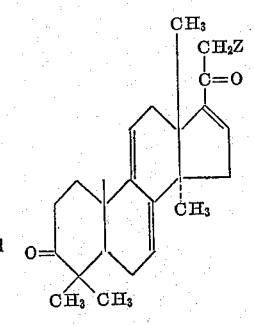

wherein each R and R' is hydrogen, and taken together R and R' is oxo; and Z is selected from the group consisting of hydrogen, hydroxy and the acyloxy radical of a hydrocarbon carboxylic acid of less than twelve carbon atoms.

2. A compound selected from the group consisting of steroids of the formulae

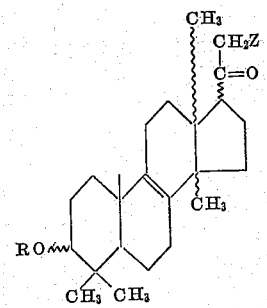 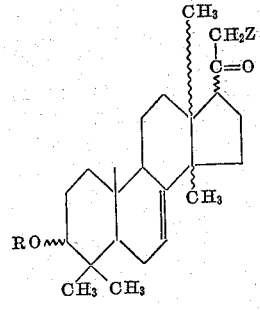

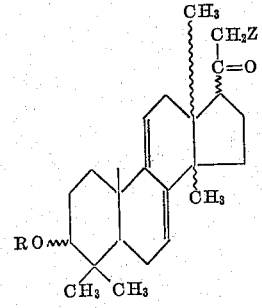 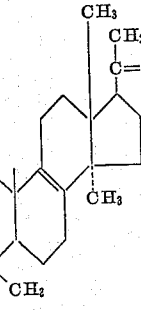

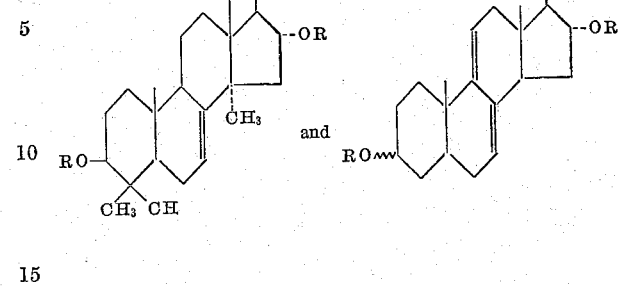

and wherein R is selected from the group consisting of hydrogen and the acyl radical of a hydrocarbon carboxylic acid of less than twelve carbon atoms, and Z is selected from the group consisting of hydrogen, hydroxy and the acyloxy radical of a hydrocarbon carboxylic acid of less than twelve carbon atoms.

3. A compound selected from the group consisting of steroids of the formulae

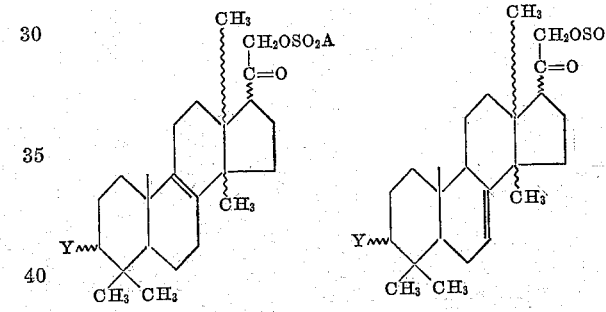

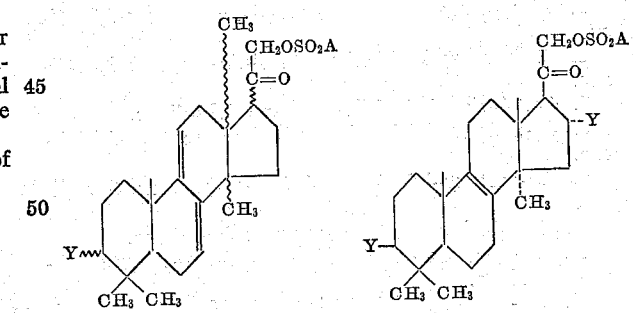

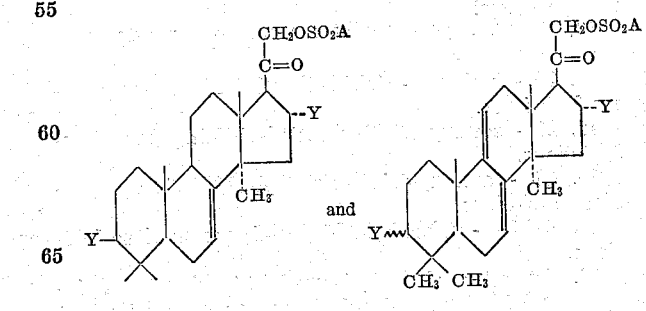

and wherein Y is selected from the group consisting of oxo and the acyloxy radical of a hydrocarbon carboxylic acid of less than twelve carbon atoms; and A is selected from the group consisting of lower alkyl and tolyl.

4. A compound selected from the group consisting of steroids of the formulae

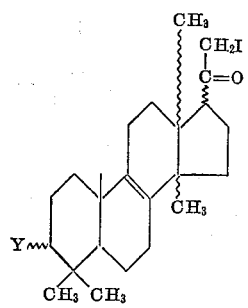 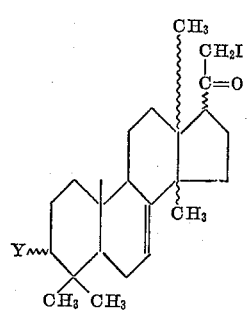

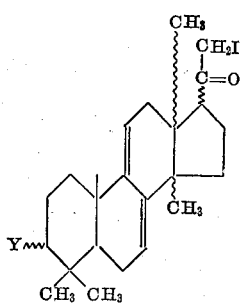 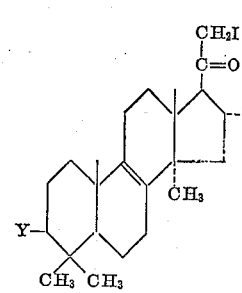

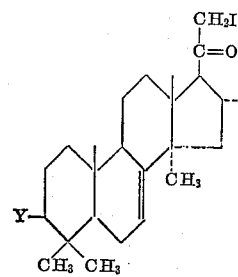 and 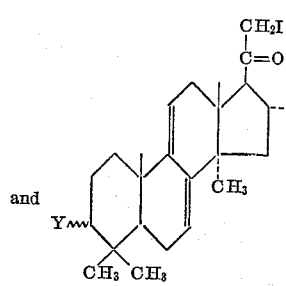

wherein Y is selected from the group consisting of oxo and the acyloxy radical of a hydrocarbon carboxylic acid of less than twelve carbon atoms.

5. 21-hydroxy-4,4,14-trimethyl-$\Delta^8$-5$\alpha$-pregnene-3,20-dione.

6. 21-acetoxy-4,4,14-trimethyl-$\Delta^8$-5$\alpha$-pregnene-3,20-dione.

7. 4,4,14-trimethyl-$\Delta^8$-5$\alpha$-pregnene 3,20-dione.

8. 21-hydroxy-4,4,14-trimethyl-$\Delta^7$-5$\alpha$-pregnene-3,20-dione.

9. 21-acetoxy-4,4,14-trimethyl-$\Delta^7$-5$\alpha$-pregnene-3,20-dione.

10. 4,4,14-trimethyl-$\Delta^7$-5$\alpha$-pregnene-3,20-dione.

11. 21-hydroxy-4,4,14-trimethyl-$\Delta^{7,9(11)}$-5$\alpha$-pregnadiene-3,20-dione.

12. 21-acetoxy-4,4,14-trimethyl-$\Delta^{7,9(11)}$-5$\alpha$-pregnadiene-3,20-dione.

13. 4,4,14-trimethyl-$\Delta^{7,9(11)}$-5$\alpha$-pregnadiene-3,20-dione.

14. 21-hydroxy-4,4,14-trimethyl-$\Delta^{8,16}$-5$\alpha$-pregnadiene-3,20-dione.

15. 21-acetoxy-4,4,14-trimethyl-$\Delta^{8,16}$-5$\alpha$-pregnadiene-3,20-dione.

16. 21-acetoxy-4,4,14-trimethyl-$\Delta^{7,9(11)16}$-5$\alpha$-pregnatriene-3,20-dione.

17. 4,4,14-trimethyl-$\Delta^{7,9(11),16}$-5$\alpha$-pregnatriene-3,20-dione.

18. An ester of 21-hydroxy-4,4,14$\alpha$-trimethyl-$\Delta^8$-5$\alpha$-pregnene-3,20-dione and a hydrocarbon carboxylic acid of less than twelve carbon atoms.

19. A 3-ester of 3$\beta$-24,28-trihydroxy-$\Delta^8$-eburicene-21-oic acid and a hydrocarbon carboxylic acid of less than twelve carbon atoms.

20. A compound selected from the group consisting of 3$\beta$,21-dihydroxy-$\Delta^{8,20(22),23}$-lanostatriene, 3$\beta$,21-dihydroxy-$\Delta^{7,20(22),23}$-lanostatriene, 3$\beta$,16$\alpha$,21-trihydroxy-$\Delta^{8,20(22),23}$-lanostatriene, 3$\beta$,16$\alpha$,21-trihydroxy-$\Delta^{7,20(22),23}$-lanostatriene, 3,16$\alpha$,21-trihydroxy-$\Delta^{7,9(11),20(22),23}$-lanostatetraene and in the positions selected from the group consisting of the 3, 16 and 21 positions the mono and diesters of each of these with hydrocarbon carboxylic acids of less than twelve carbon atoms.

21. A process for preparing compounds of the formulae

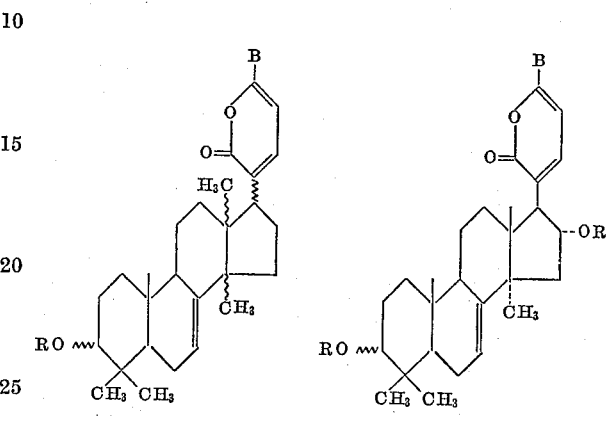

which comprises treating a compound selected from the group consisting of

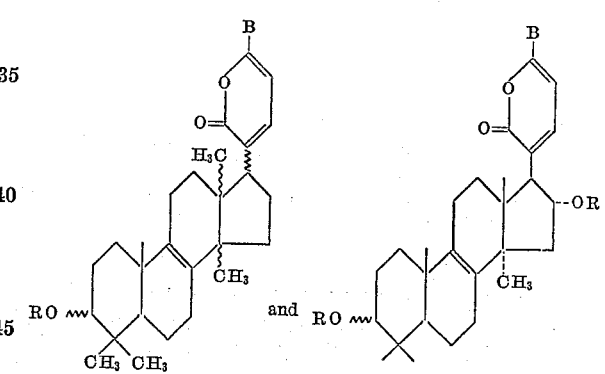

wherein R is selected from the group consisting of hydrogen and acyl wherein the acyl group is of a hydrocarbon carboxylic acid of less than twelve carbon atoms; and B is selected from the group consisting of hydrogen and lower alkyl; with hydrogen chloride.

22. A compound selected from the group consisting of steroids of the formulae

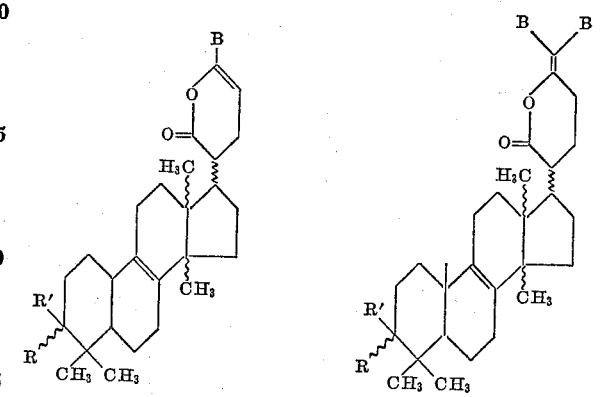

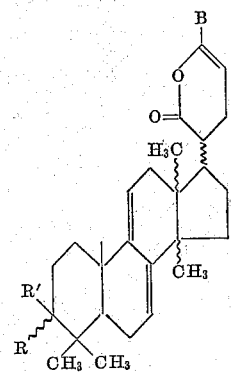

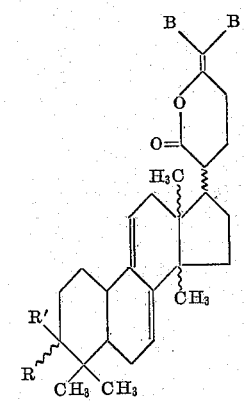

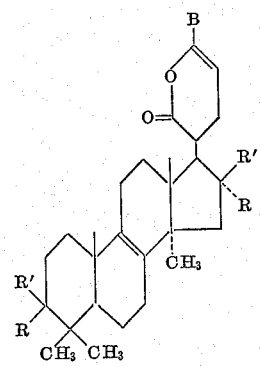

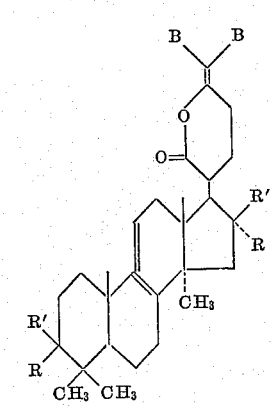

wherein R' is hydrogen; R is acycloxy, wherein the acyl radical is from a hydrocarbon carboxylic acid of less than twelve carbon atoms; and B is selected from the group consisting of hydrogen and lower alkyl.

23. A compound selected from the group consisting of steroids of the formulae

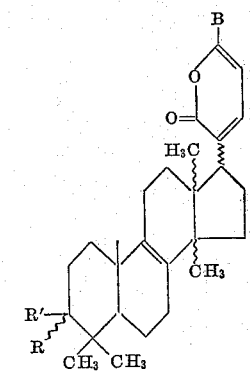 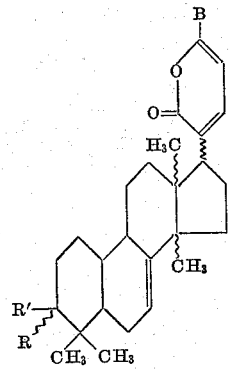

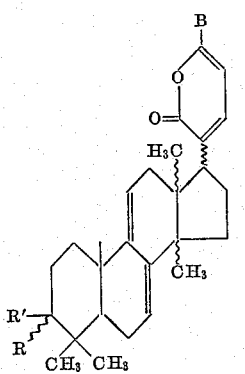 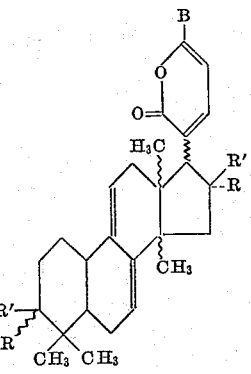

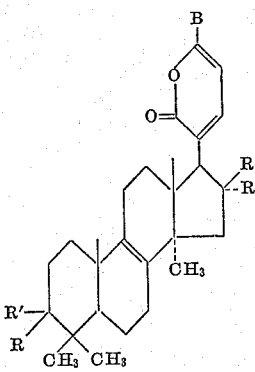 and 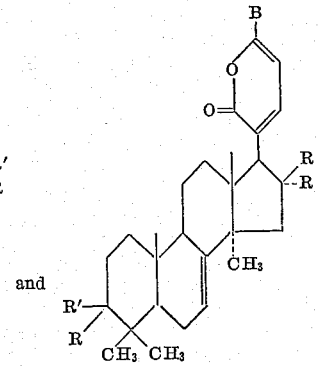

wherein R' is hydrogen; each R is selected from the group consisting of hydroxy and acyloxy, wherein the acyl radical is from a hydrocarbon carboxylic acid of less than twelve carbon atoms, and together R' and R is oxo; and B is selected from the group consisting of hydrogen and lower alkyl.

24. A compound selected from the group consisting of steroids of the formulate

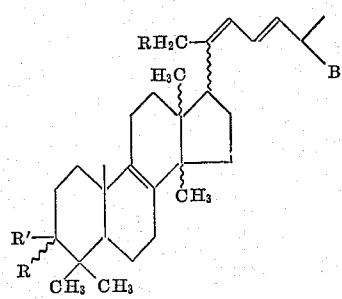

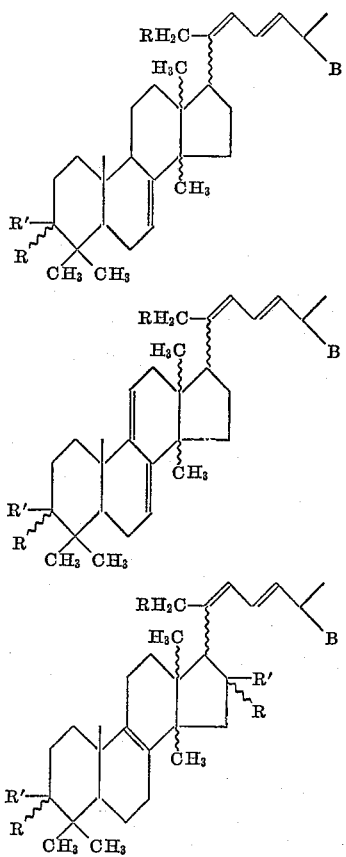

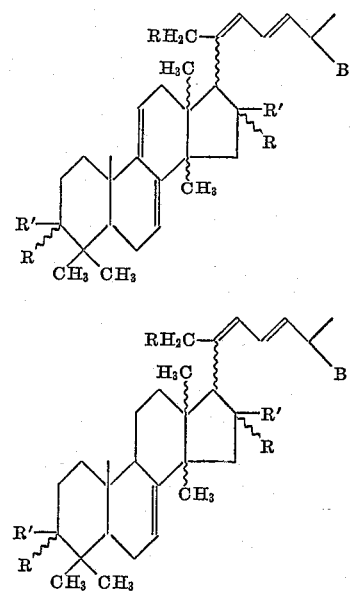

wherein each R' is hydrogen, each R is selected from the group consisting of hydroxy and acyloxy, wherein the acyl radical is of a hydrocarbon carboxylic acid of less than twelve carbon atoms; and B is selected from the group consisting of hydrogen and lower alkyl.

References Cited in the file of this patent

Rosenthal et al.: "Journal of the American Chemical Soc." (1962), vol. 84, page 878.